(12) United States Patent
Shen

(10) Patent No.: US 11,226,722 B2
(45) Date of Patent: Jan. 18, 2022

(54) INFORMATION INTERACTION METHOD AND APPARATUS, STORAGE MEDIUM, AND ELECTRONIC APPARATUS

(71) Applicant: Tencent Technology (Shenzhen) Company Limited, Shenzhen (CN)

(72) Inventor: Chao Shen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/561,388

(22) Filed: Sep. 5, 2019

(65) Prior Publication Data

US 2019/0391710 A1 Dec. 26, 2019

Related U.S. Application Data

(63) Continuation of application No. PCT/CN2018/106936, filed on Sep. 21, 2018.

(30) Foreign Application Priority Data

Sep. 25, 2017 (CN) .......................... 201710873684.X

(51) Int. Cl.
  *G06F 3/0481* (2013.01)
  *G06F 3/0482* (2013.01)
  (Continued)

(52) U.S. Cl.
  CPC ............ *G06F 3/0482* (2013.01); *A63F 13/23* (2014.09); *G06F 3/04815* (2013.01);
  (Continued)

(58) Field of Classification Search
  CPC .................................................. G06F 16/5854
  See application file for complete search history.

(56) References Cited

U.S. PATENT DOCUMENTS

| | | | |
|---|---|---|---|
| 2008/0307351 A1* | 12/2008 | Louch ................... | G06F 3/0481 715/782 |
| 2008/0310604 A1* | 12/2008 | Agarwal ................ | G06Q 30/02 379/88.18 |

(Continued)

FOREIGN PATENT DOCUMENTS

| | | |
|---|---|---|
| CN | 102592484 A | 7/2012 |
| CN | 103064514 A | 4/2013 |

(Continued)

OTHER PUBLICATIONS

Pogue et al., Windows XP Pro Edition: The Missing Manual, 2nd Edition (2004).*

(Continued)

*Primary Examiner* — Di Xiao
(74) *Attorney, Agent, or Firm* — Crowell & Moring LLP

(57) ABSTRACT

This application discloses an information interaction method and apparatus, a storage medium, and an electronic apparatus. The method includes obtaining a first target operation instruction in a VR scenario; selecting and displaying a first virtual operation panel corresponding to the first target operation instruction from a plurality of virtual operation panels in the VR scenario, wherein the plurality of virtual operation panels are displayed mutually independently, and are respectively configured to display different interactive objects. The method may further include obtaining an interactive operation instruction generated by an interactive operation performed by an interactive device on a target interactive object displayed in the first virtual operation panel, the interactive device being associated with the VR scenario; and in response executing a target event corresponding to the target interactive object in the VR scenario. These solutions resolve the technical problem of low information interaction flexibility in the related technology.

20 Claims, 11 Drawing Sheets

(51) Int. Cl.
   *A63F 13/23* (2014.01)
   *G06F 3/0484* (2013.01)
   *G06F 3/0488* (2013.01)
   *A63F 13/533* (2014.01)
(52) U.S. Cl.
   CPC ...... *G06F 3/04845* (2013.01); *G06F 3/04883* (2013.01); *A63F 13/533* (2014.09); *A63F 2300/1025* (2013.01); *A63F 2300/308* (2013.01); *A63F 2300/8082* (2013.01)

(56) References Cited

U.S. PATENT DOCUMENTS

| | | | |
|---|---|---|---|
| 2013/0290907 A1* | 10/2013 | Oddiraju | G06F 3/04842 715/845 |
| 2015/0058102 A1 | 2/2015 | Christensen et al. | |
| 2016/0012160 A1* | 1/2016 | Mohacsi | G06F 30/13 703/1 |
| 2016/0147429 A1* | 5/2016 | Byun | G06F 3/04847 715/781 |
| 2017/0038850 A1 | 2/2017 | Fleishman et al. | |
| 2017/0336882 A1* | 11/2017 | Tome | G06F 3/0346 |
| 2018/0321737 A1* | 11/2018 | Pahud | G06F 3/0346 |
| 2019/0347865 A1* | 11/2019 | Hackett | G06F 30/00 |

FOREIGN PATENT DOCUMENTS

| | | |
|---|---|---|
| CN | 105159450 A | 12/2015 |
| CN | 106919270 A | 7/2017 |
| CN | 107168530 A | 9/2017 |
| CN | 109557998 A | 4/2019 |

OTHER PUBLICATIONS

International Search Report and Written Opinion for International Patent Application No. PCT/CN2018/106936 dated Dec. 25, 2018, 9 pages.

Chinese Office Action for Chinese Application No. 201710873684 dated Jan. 20, 2021 including an English Concise Explanation of Relevance (14 pages).

* cited by examiner

INFORMATION INTERACTION METHOD AND APPARATUS, STORAGE MEDIUM, AND ELECTRONIC APPARATUS

CROSS-REFERENCE TO RELATED APPLICATION(S)

This application is a continuation of International Patent Application No. PCT/CN2018/106936, filed on Sep. 21, 2018, which claims priority to Chinese Patent Application No. 201710873684.X, entitled "INFORMATION INTERACTION METHOD AND APPARATUS, STORAGE MEDIUM, AND ELECTRONIC APPARATUS" filed with the China National Intellectual Property Administration on Sep. 25, 2017, all of which are incorporated by reference in their entirety.

FIELD OF THE TECHNOLOGY

This application relates to the field of computers, and specifically, to an information interaction method and apparatus, a storage medium, and an electronic apparatus.

BACKGROUND OF THE DISCLOSURE

Currently, for games in a two-dimensional (2D) display environment, such as a host game and a mobile phone game, a menu is usually created by using a 2D panel that is faced to a display and that is independent of a scenario. In a case that the final display of a game is a 2D display, the menu is not content that needs to exist in a three-dimensional (3D) game scenario, but is used as a connection medium between a game player and game content. The menu is created by using the 2D panel independent of the game scenario, so that the 2D panel may be directly faced to the display direction of the display, for users to select more quickly and conveniently. Game logics of a virtual world are not affected, and the creation of the menu is relatively independent. Therefore, the creation of the menu is not involved in all 3D game scenarios. In addition, on the premise of mouse operation, directly clicking the menu of the game by using a mouse is a very intuitive operation, and basically does not involve the possibility of a complicated interactive operation.

In a virtual reality (VR) environment, because a user may sense changes and feelings of a 3D space, the interactive operation manner may no longer be the operation such as clicking the mouse, or no longer be reversely mapping to the 3D space according to a position change of a 2D interface to operate the virtual world, but directly obtaining a position of the user in a real 3D space. The position may directly correspond to a 3D position of a virtual space. Therefore, no original mouse operation (a correspondence from a 2D screen space to a 3D virtual space) exists. The menu originally using the 2D panel is more suitable for being displayed in a 3D manner, and the menu is used as a 3D object of the virtual world and directly integrated into the virtual world scenario, to more facilitate the operation of the user.

Interactions in the VR environment are implemented by interacting a ray emitted by an interactive device and a 2D menu panel of the 3D space.

FIG. 1 is a schematic diagram of an interface interaction in a VR environment according to the related technology. As shown in FIG. 1, the interface is a menu interactive interface of Steam VR, and the Steam VR implements VR experience of a fully functional 360° room space. In the 3D space, a ray is emitted from a handle, the ray points to the 2D panel in the 3D space, and the intersection between the ray and the 2D panel is a position at which the user hopes to interact with the 2D panel. The position is similar to a position indicated by the mouse during the mouse operation, and keys of the handle are similar to keys of the mouse. The interactive operation and response are performed on the 2D menu panel in the 3D space by using the keys of the handle.

FIG. 2 is a schematic diagram of an interface interaction in another VR environment according to the related technology. As shown in FIG. 2, the interface is a menu interactive interface of Oculus Home, and shares the same operation process with a main menu interface of the Steam VR shown in FIG. 1. Oculus is an American VR technology company whose first product Oculus Rift is a realistic VR head-mounted display.

The interface interactions shown in the foregoing FIG. 1 and FIG. 2 are currently common interaction solutions in which a 2D panel is converted to a menu panel in a 3D plane mainly according to the mouse operation, and then a ray is directly used to perform an operation. Features of such operation manner are as follows: First, the entire menu interface is a menu panel, and all menu content is simply concentrated on the menu panel, causing content of important menu systems to overlay on the menu panel, that is, the 3D virtual space is not fully used to display information; second, the menu panel is relatively in a remote place in the scenario and far from operators, and can only be contained in a very empty scenario, instead of being suitable for any scenario in games; third, the menu panel is far from users, and cannot be touched very intuitively but a ray operation manner needs to be used; finally, the position of the menu panel is fixed in the scenario, causing a lack of flexibility for use of the menu panel, and menu options on the menu panel are difficulty to be used without pausing games, causing a problem of low information interaction flexibility.

Currently, there is no effective solution to the problem of low information interaction flexibility in the foregoing related technology.

SUMMARY

Embodiments of this application provide an information interaction method and apparatus, a storage medium, and an electronic apparatus, to resolve at least the technical problem of low information interaction flexibility in the related technology.

According to an aspect of the embodiments of this application, an information interaction method is provided. The information interaction method includes: obtaining a first target operation instruction in a VR scenario; selecting and displaying a first virtual operation panel corresponding to the first target operation instruction from a plurality of virtual operation panels in the VR scenario, the plurality of virtual operation panels being displayed mutually independently, and being respectively configured to display different interactive objects; obtaining an interactive operation instruction generated by an interactive operation performed by an interactive device on a target interactive object in an interactive object displayed in the first virtual operation panel, the interactive device being associated with the VR scenario; and executing a target event corresponding to the target interactive object in the VR scenario in response to the interactive operation instruction.

According to another aspect of the embodiments of this application, an information interaction apparatus is further provided. The information interaction apparatus includes: a first obtaining unit, configured to obtain a first target operation instruction in a VR scenario; a display unit, configured to select and display a first virtual operation panel corresponding to the first target operation instruction from a plurality of virtual operation panels in the VR scenario, the plurality of virtual operation panels being displayed mutually independently, and being respectively configured to display different interactive objects; a second obtaining unit, configured to obtain an interactive operation instruction generated by an interactive operation performed by an interactive device on a target interactive object in an interactive object displayed in the first virtual operation panel, the interactive device being associated with the VR scenario; and a processing unit, configured to execute a target event corresponding to the target interactive object in the VR scenario in response to the interactive operation instruction.

In the embodiments of this application, a first target operation instruction is obtained in a VR scenario; a first virtual operation panel corresponding to the first target operation instruction is selected and displayed from a plurality of virtual operation panels in the VR scenario, the plurality of virtual operation panels being displayed mutually independently, and being respectively configured to display different interactive objects; an interactive operation instruction generated by an interactive operation performed by an interactive device on a target interactive object in an interactive object displayed in the first virtual operation panel is obtained, the interactive device being associated with the VR scenario; and a target event corresponding to the target interactive object is executed in the VR scenario in response to the interactive operation instruction. A plurality of mutually independent virtual operation panels in the VR scenario is respectively configured to display different interactive information, to implement different functions, thereby achieving the objective of operating the virtual operation panel, improving operation flexibility of the virtual operation panel, and further resolving the technical problem of low flexibility information interaction in the related technology.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. In the figures.

DETAILED DESCRIPTION

To make a person skilled in the art better understand solutions of this application, the following clearly and completely describes the technical solutions in the embodiments of this application with reference to the accompanying drawings in the embodiments of this application. Apparently, the described embodiments are merely some rather than all of the embodiments of this application. All other embodiments obtained by a person skilled in the art based on the embodiments of the present application without creative efforts shall fall within the protection scope of the present application.

In the specification, claims, and accompanying drawings of this application, the terms "first", "second", and so on are intended to distinguish between similar objects rather than indicating a specific order. It should be understood that data used in this way can be interchanged in an appropriate case, so that the embodiments of this application that are described herein can be implemented in a sequence other than those sequences illustrated or described herein. In addition, the terms "include", "comprise", and any variants thereof are intended to cover a non-exclusive inclusion. For example, a process, method, system, product, or device that includes a series of steps or elements is not limited to the steps or units that are clearly listed, but may include other steps or units that are not clearly listed or that are inherent to the process, method, product, or device.

According to the embodiments of this application, an embodiment of an information interaction method is provided.

Figure 3:
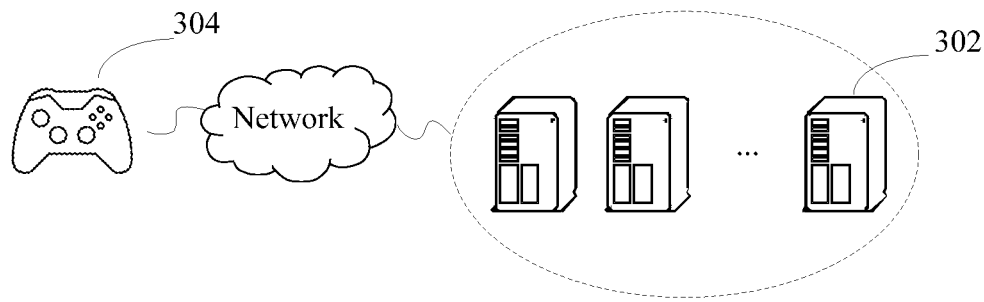
FIG. 3 is a schematic diagram of a hardware environment of an information interaction method according to an embodiment of this application.

Optionally, in this embodiment, the information interaction method may be applied to a hardware environment formed by a server 302 and an interactive device 304 shown in FIG. 3, or may be applied to a hardware environment formed by only an interactive device 304. FIG. 3 is a schematic diagram of a hardware environment of an information interaction method according to an embodiment of this application. As shown in FIG. 3, the server 302 is connected to the interactive device 304 through a network. The network includes, but is not limited to, a wide area network, a metropolitan area network, or a local area network. The interactive device 304 is not limited to a VR device or the like. All interactive devices supporting a 3D spatial position, for example, a hand-separated handle, may be supported. The information interaction method in this embodiment of this application may be performed by the server 302, or may be performed by the interactive device 304, or may be performed by both the server 302 and the interactive device 304. When the interactive device 304 performs the information interaction method in this embodiment of this application, the information interaction method may alternatively be performed by a client installed in the interactive device 304.

Figure 4:
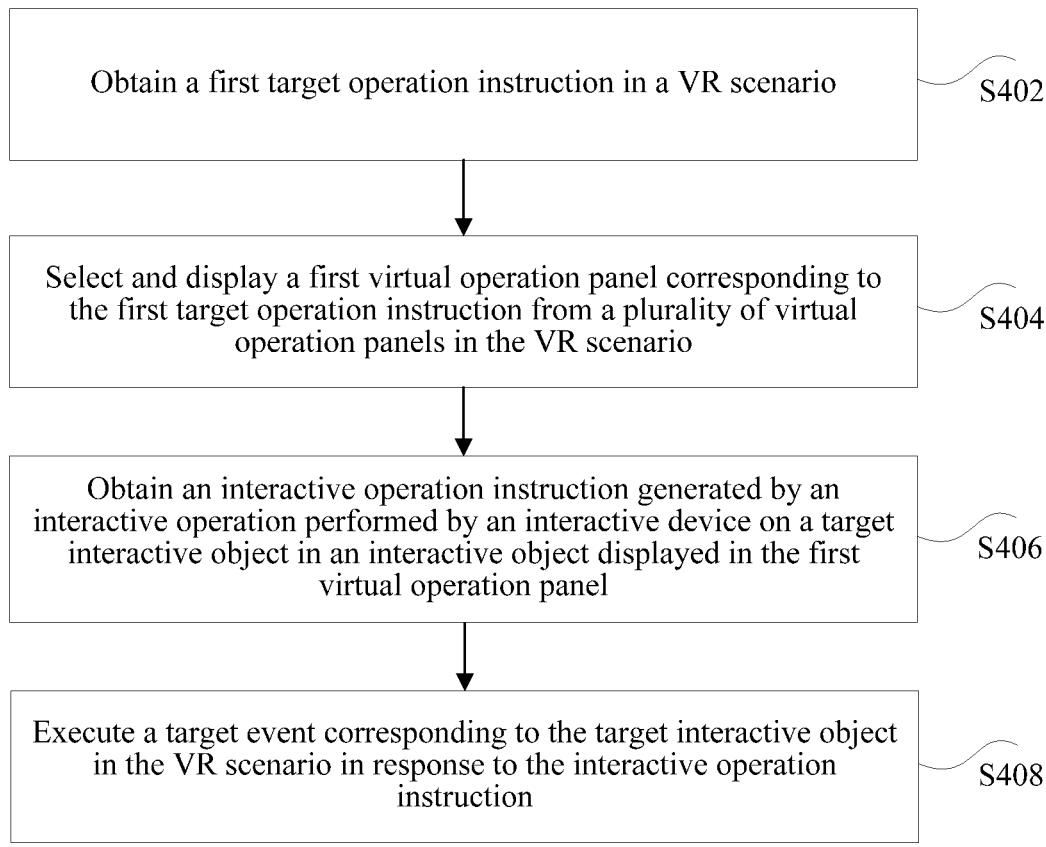
FIG. 4 is a flowchart of an information interaction method according to an embodiment of this application.

FIG. 4 is a flowchart of an information interaction method according to an embodiment of this application. As shown in FIG. 4, the method may include the following steps.

Step S402. Obtain a first target operation instruction in a VR scenario.

In the technical solution provided in the foregoing step S402 in this embodiment of this application, the first target operation instruction is obtained in the VR scenario.

Virtual reality, that is, VR, uses a virtual technology, also referred to as a virtual environment, and is generating a virtual world of a 3D space through simulation by using a computer, and providing simulation about sensory such as visions to a user, so that the user may feel immersive, and may observe objects in the 3D space in time unrestrictedly.

The VR scenario in this embodiment is a scenario suitable for a specific application obtained by simulating a real scenario by using the foregoing VR technology. For example, the VR scenario is a scenario suitable for a game application obtained by matching a real space completely to a virtual space by using the VR technology, where the game application is a VR game application. In the VR scenario, a user matches a virtual control role. Optionally, an operation of the user matches a behavior in a virtual scenario. For example, when the user presses a key on an interactive device, selection on an interactive object displayed in a virtual operation panel is triggered. When the user releases the key on the interactive device, the selection on the interactive object displayed in the virtual operation panel is cancelled. In addition, the VR scenario may provide a simulation scenario about sensory such as visions to the user, so that the user may observe objects in the scenario in time unrestrictedly by using a virtual role, and the user may feel immersive in the real scenario.

The foregoing VR scenario is only an optional implementation in this embodiment of this application, and it does not mean that the representation of the VR scenario in this embodiment of this application is only limited to the foregoing manner. Any representation form that may implement the information interaction method, and may improve operation flexibility of the virtual operation panel falls within the protection scope of this application, which is not described herein by using examples.

The first target operation instruction is obtained in the VR scenario. The first target operation instruction may be an instruction used for selecting a to-be-operated virtual operation panel in the VR scenario. The virtual operation panel is a virtual interface used for displaying an interactive object in the VR scenario, for example, displaying a menu. Various game operations are integrated into the menu for use, and different interactive functions in the VR scenario are implemented by selecting different menus. The user may generate the first target operation instruction by operating the interactive device, for example, moving a rocker on the interactive device, controlling a virtual object in the VR scenario to move, pressing a button on a handle after the to-be-operated virtual operation panel is determined, and controlling the virtual object to click the virtual operation panel, thereby generating the first target operation instruction. The virtual object is used for instructing to operate an object in the VR scenario. The instruction may be performed by a virtual hand or another icon, which is not limited herein.

Step S404. Select and display a first virtual operation panel corresponding to the first target operation instruction from a plurality of virtual operation panels in the VR scenario.

In the technical solution provided in the foregoing step S404 in this embodiment of this application, the first virtual operation panel corresponding to the first target operation instruction is selected and displayed from the plurality of virtual operation panels in the VR scenario. The plurality of virtual operation panels are displayed mutually independently, and are respectively configured to display different interactive objects.

In this embodiment, a plurality of virtual operation panels is disposed in the VR scenario, and the plurality of virtual operation panels are independently displayed, and may display different content. For example, the virtual operation panel is a virtual operation panel configured to perform disposing, a virtual operation panel configured to display personal information, a virtual operation panel configured to perform information notification, a virtual operation panel configured to transmit and receive emails, a virtual operation panel configured to communicate with and manage friends, or the like, which is not limited herein. The size of the plurality of virtual operation panels may be determined by displayed content. For example, when the virtual operation panel needs to display more content, the size of the virtual operation panel is larger, and when the virtual operation panel needs to display less content, the size of the virtual operation panel is smaller.

Optionally, the virtual operation panel is implemented in the VR scenario in a 2D form, and may be completely compatible with the current game making manner. As long as a 2D menu interface is made, and then the 2D menu interface is attached to an entity mesh model on the virtual operation panel by using a component, for example, the 2D menu is attached to the entity mesh model on the virtual operation panel by using a WidgetComponent, the virtual operation panel may be displayed in a game, and an interaction between the interactive device and the virtual operation panel may be implemented.

Optionally, visual representation forms of the plurality of virtual operation panels may vary, which are not limited herein. Interactive functions of the plurality of virtual operation panels may be different, or may have an association relationship, which is not limited herein, thereby fully using the advantage of spatial expansion brought by the VR environment, and preventing the entire menu interface from being implemented by only simply using one panel. All content is concentrated on one panel, causing a defect that important menu content overlays on the panel.

Optionally, when the user actively opens the interface in the VR scenario, a plurality of virtual operation panels is displayed, and the plurality of virtual operation panels may be randomly placed in the VR scenario. The quantity and types of the plurality of virtual operation panels may be preset. For example, three virtual operation panels are displayed, and the three virtual operation panels are respectively configured to play information, select expressions, and set volume, which are not limited herein.

After the first target operation instruction is obtained, the first virtual operation panel corresponding to the first target operation instruction is selected and displayed from the plurality of virtual operation panels in the VR scenario. After the first target operation instruction is generated by using the interactive device, the first virtual operation panel corresponding to the first target operation instruction may be selected and displayed from the plurality of virtual operation panels in response to the first target operation instruction. Optionally, when the virtual object is controlled by using the interactive device to touch the virtual operation panel, it is determined that the first virtual operation panel in the plurality of virtual operation panels is selected, or when the virtual object is controlled by using the interactive device to touch a preset selected button on the virtual operation panel, it is determined that the first virtual operation panel in the plurality of virtual operation panels is selected, and the first virtual operation panel is displayed to display content of the first virtual operation panel.

Optionally, a plurality of virtual operation devices corresponds to indication information used for indicating the plurality of virtual operation panels, and the indication information of the plurality of virtual operation panels may be displayed in a form of a list or a menu, which is not limited herein. When the user controls, by using the interactive device, the virtual object to click indication information of a virtual operation panel, a first target operation instruction is generated, and the clicked virtual operation panel is further determined as a first virtual operation panel.

Step S406. Obtain an interactive operation instruction generated by an interactive operation performed by an interactive device on a target interactive object in an interactive object displayed in the first virtual operation panel.

In the technical solution provided in the foregoing step S406 in this embodiment of this application, the interactive operation instruction generated on the interactive operation performed by the interactive device on the target interactive object in the interactive object displayed in the first virtual operation panel is obtained, the interactive device being associated with the VR scenario.

The interactive device in this embodiment is configured to generate an interactive operation instruction in the VR scenario, and configured to perform an interaction between the user and the VR scenario, to obtain a position of a 3D space. The interactive device may be a handle configured to capture actions, and may be configured to cooperate with a space location system to use. A camera is allowed to track the hand of the user, and a sensor may also track finger actions, and also bring a convenient grasp manner to the user. For example, the interactive device is a Vive device or an Oculus Touch device. The handle may be a hand-separated handle, configured to obtain position information in the VR scenario.

An interactive object is displayed in the first virtual operation panel. The interactive object may be used for indicating a function that may be implemented by the first virtual operation panel, for example, an expression selection function. The first virtual operation panel may display a plurality of interactive objects. The plurality of interactive objects includes a target interactive object that the user expects to select. The target interactive object may be used for implementing a function that the user expects to implement in the VR scenario.

After selecting and displaying the first virtual operation panel corresponding to the first target operation instruction from the plurality of virtual operation panels in the VR scenario, the interactive device determines a target interactive object in the interactive object displayed in the first virtual operation panel, and obtains the interactive operation instruction generated by the interactive operation performed by the interactive device on the target interactive object, for example, obtains an interactive operation instruction of closing the first virtual operation panel generated by a clicking operation performed by the virtual object of the interactive device in the VR scenario on a close button in the first virtual operation panel. Optionally, the interactive operation performed by the interactive device on the target interactive object may be indicated by using the virtual object in the VR scenario. The interactive operation instruction performed on the target interactive object may be an interactive operation instruction for the interactive device to touch the 2D menu in the first virtual operation panel by using the virtual object; or may be an interactive operation instruction used for closing the first virtual operation panel, where the function of closing the first virtual operation panel may be encapsulated by a component, for example, an OptExitComponent; or may be an interactive operation instruction used for changing the position of the first virtual operation panel. The posture change of the virtual object in the VR scenario may be controlled by using the interactive device, to control the position change of the first virtual operation panel in the VR scenario.

Optionally, in this embodiment, which space in the VR scenario may touch the virtual object of the interactive device in the VR scenario may be marked by using a component. For example, the component is an OptInteractiveComponent. The marked region in the VR scenario may be used as a region for the interactive device and the VR scenario to perform interactions.

Step S408. Execute a target event corresponding to the target interactive object in the VR scenario in response to the interactive operation instruction.

In the technical solution provided in the foregoing step S408 in this embodiment of this application, the target event corresponding to the target interactive object is executed in the VR scenario is response to the interactive operation instruction.

After the interactive operation instruction generated by the interactive operation performed by the interactive device on the target interactive object in the interactive object displayed in the first virtual operation panel is obtained, an interactive result for the interactive operation instruction is obtained in response to the interactive operation instruction. For example, when the interactive operation instruction is an interactive operation instruction used for the interactive device to touch the 2D menu in the first virtual operation panel by using the virtual object, the interactive result obtained in response to the interactive operation instruction is an interactive result of interacting with the 2D menu; when the interactive operation instruction is an interactive operation instruction used for closing the first virtual operation panel, the interactive result obtained in response to the interactive operation instruction is an interactive result of closing the first virtual operation panel; and when the interactive operation instruction is an interactive operation instruction used for changing the position of the first virtual operation panel, the interactive result obtained in response to the interactive operation instruction is an interactive result of moving the position of the first virtual operation panel to a new position.

This embodiment may support a plurality of virtual operation panels to be displayed in the VR scenario, so that combination use and quick switch between the virtual operation panels also become possible, thereby improving operation flexibility of the virtual operation panel, facilitating user operation, and improving user experience.

By using the foregoing step S402 to step S408, a first target operation instruction is obtained in a VR scenario; a first virtual operation panel corresponding to the first target operation instruction is selected and displayed from a plurality of virtual operation panels in the VR scenario, the plurality of virtual operation panels being displayed mutually independently, and being respectively configured to display different interactive objects; an interactive operation instruction generated by an interactive operation performed by an interactive device on a target interactive object in an interactive object displayed in the first virtual operation panel is obtained, the interactive device being associated with the VR scenario; and a target event corresponding to the target interactive object is executed in the VR scenario in response to the interactive operation instruction. A plurality of mutually independent virtual operation panels in the VR scenario is respectively configured to display different interactive information, to implement different functions, thereby achieving the objective of operating the virtual operation panel, improving operation flexibility of the virtual operation panel, and further resolving the technical problem of low flexibility information interaction in the related technology.

In an optional embodiment, step S406 of obtaining an interactive operation instruction generated by an interactive operation performed by an interactive device on a target interactive object in an interactive object displayed in the first virtual operation panel includes: obtaining a touch operation instruction generated by a touch operation performed by the interactive device on the target interactive object, where the interactive operation instruction includes the touch operation instruction, and the touch operation instruction is used for triggering a target event corresponding to the target interactive object.

In this embodiment, the interactive operation performed by the interactive device on the target interactive object includes a touch operation, where the touch operation may be an operation that the interactive device makes the virtual object in the VR scenario touch the target interactive object, for example, the operation that the interactive device makes the virtual object click or double-click the target interactive object. A touch operation instruction generated when the interactive device performs the touch operation on the target interactive object is obtained, and the target event corresponding to the target interactive object is triggered by using the touch operation instruction. For example, the target interactive object is a volume setting object, a touch operation instruction generated when a virtual hand of the interactive device in the VR scenario performs a touch operation on the volume setting object is obtained, and a volume adjustment event corresponding to the volume setting object is triggered by using the touch operation instruction.

In an optional embodiment, step S408 of executing a target event corresponding to the target interactive object in the VR scenario in response to the interactive operation instruction includes: obtaining first position information of the interactive device during generating of the touch operation instruction; and executing the target event corresponding to the target interactive object triggered by the touch operation instruction in the VR scenario.

Figure 5:
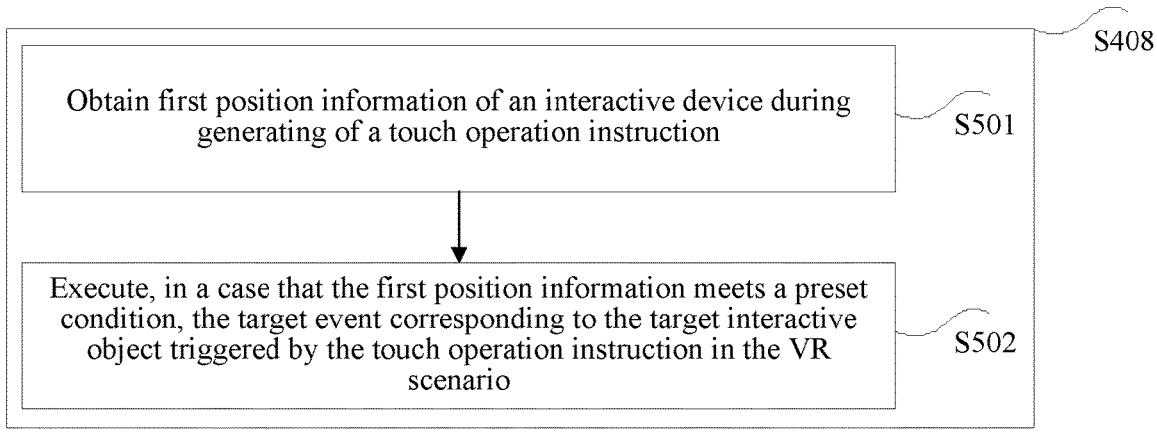
FIG. 5 is a flowchart of a method for executing a target event corresponding to a target interactive object in a VR scenario according to an embodiment of this application.

FIG. 5 is a flowchart of a method for executing a target event corresponding to a target interactive object in a VR scenario according to an embodiment of this application. As shown in FIG. 5, the method includes the following steps.

Step S501. Obtain first position information of an interactive device during generating of a touch operation instruction.

In the technical solution provided in the foregoing step S501 in this embodiment of this application, the first position information of the interactive device is obtained during generating of the touch operation instruction, where the first position information is used for indicating a first position of a virtual object of the interactive device in the VR scenario on the first virtual operation panel.

The interactive device has a corresponding virtual object in the VR scenario, and the virtual object may be used for indicating an operation performed by the interactive device, where the position of the virtual object in the VR scenario may be used for indicating a position of an interactive operation performed by the interactive device in the VR scenario, and may be a virtual hand, or another icon, which is not limited herein.

After the interactive operation instruction generated by the interactive operation performed by the interactive device on the target interactive object is obtained, first position information corresponding to the interactive device during generating of the touch operation instruction in the VR scenario is obtained. The first position information is used for indicating a first position when a virtual object corresponding to the interactive device performs a touch operation on the first virtual operation panel. The first position is a position at which the interactive device performs an operation on the first virtual operation panel, and may correspond to a specific interactive object.

Step S502. Execute, in a case that the first position information meets a preset condition, the target event corresponding to the target interactive object triggered by the touch operation instruction in the VR scenario.

In the technical solution provided in the foregoing step S502 in this embodiment of this application, in a case that the first position information meets the preset condition, the target event corresponding to the target interactive object triggered by the touch operation instruction is executed in the VR scenario.

After the first position information of the interactive device is obtained during generating of the touch operation instruction, whether the first position information meets the preset condition is determined. When the first position indicated by the first position information is included in an interactive region corresponding to the target interactive object, it is determined that the first position information meets the preset condition, and when the first position indicated by the first position information is not included in the interactive region corresponding to the target interactive object, it is determined that the first position information does not meets the preset condition. In a case that the first position information meets the preset condition, the target event corresponding to the target interactive object triggered by the touch operation instruction is executed in the VR scenario. For example, when the first position indicated by the first position information is included in a volume setting button of the volume setting object, it is determined that the first position information meets the preset condition, and a volume setting event corresponding to the volume setting object triggered by the touch operation instruction is executed in the VR scenario.

In this embodiment, during generating of the touch operation instruction, the first position information used for indicating the first position of the virtual object of the interactive device in the VR scenario on the first virtual operation panel is obtained. In a case that the first position information meets the preset condition, the target event corresponding to the target interactive object triggered by the touch operation instruction is executed in the VR scenario, thereby implementing the objective of executing the target event corresponding to the target interactive object in the VR scenario in response to the interactive operation instruction, and avoiding a counter-intuitive operation manner implemented by the interactive device by using a ray operation, so that the user may intuitively touch the interactive object by using the virtual object of the interactive device in the VR scenario, thereby improving operation flexibility of the virtual operation panel.

In an optional embodiment, after the obtaining the touch operation instruction generated by the touch operation performed by the interactive device on the target interactive object, the method further includes: displaying first feedback information in the VR scenario; and/or outputting second feedback information to the interactive device, where the second feedback information is used for instructing the interactive device to perform a target operation.

In this embodiment, when the interactive operation is performed, information may be fed back to the user. After obtaining the touch operation instruction generated by the touch operation performed by the interactive device on the target interactive object, the first feedback information is displayed in the VR scenario. The first feedback information is used for triggering visions of the user. For example, the touch operation instruction causes the color of the interactive region of the virtual object to become darker or lighter, to distinguish from other regions on which no interactive operation has been performed. The second feedback information may also be outputted to the interactive device, where the second feedback information is used for instructing the interactive device to perform a target operation. Optionally, the target operation is a vibration operation, so that the user feels a vibration feedback of the interactive device, to determine that the interactive device has performed the touch operation on the target interactive object, and has generated the touch operation instruction. Optionally, the target operation in this embodiment may further be a prompt operation performed by the interactive device by using audio information, for example, a voice prompt operation or a prompt tone operation, which is not limited herein. The voice prompt operation may enable the user to learn the situation of a currently performed touch operation by using voice content, for example, the target interactive object is a volume setting object. When a volume adjustment event corresponding to the volume setting object is triggered by using the touch operation instruction, the interactive device may output prompt voice "Your currently performed operation is an volume adjustment operation" or the like. The prompt tone operation may enable the interactive device to output a prompt tone, and the prompt tone may be a single prompt message. When the interactive device has performed the touch operation on the target interactive object and has generated the touch operation instruction, the interactive device outputs the prompt tone, so that the user quickly senses that the touch operation has been currently performed, and the touch operation instruction has been generated. Therefore, the user experiences the touch operation performed by the virtual object of the interactive device in the VR scenario on the target interactive object by using the foregoing manner, and achieving the effect of fully using a more natural and flexible interaction manner brought by VR.

In an optional embodiment, step S406 of obtaining an interactive operation instruction generated by an interactive operation performed by an interactive device on a target interactive object in an interactive object displayed in the first virtual operation panel includes: in a case of detecting that a first gesture performed by the virtual object of the interactive device in the VR scenario on the first target interactive object is a first preset gesture, obtaining a first interactive operation instruction generated by a first operation performed on the first target interactive object, to prepare for moving the first virtual operation panel; after the first interactive operation instruction is responded to, obtaining a second interactive operation instruction generated by a second operation performed on the first virtual operation panel, so that the first virtual operation panel moves as the virtual object of the interactive device in the VR scenario moves; and in a case of detecting that the virtual object of the interactive device in the VR scenario changes from the first gesture to a second gesture, and the second gesture is a second preset gesture, obtaining a third interactive operation instruction generated by a third operation performed on the first target interactive object, to stop moving the first virtual operation panel.

Figure 6:
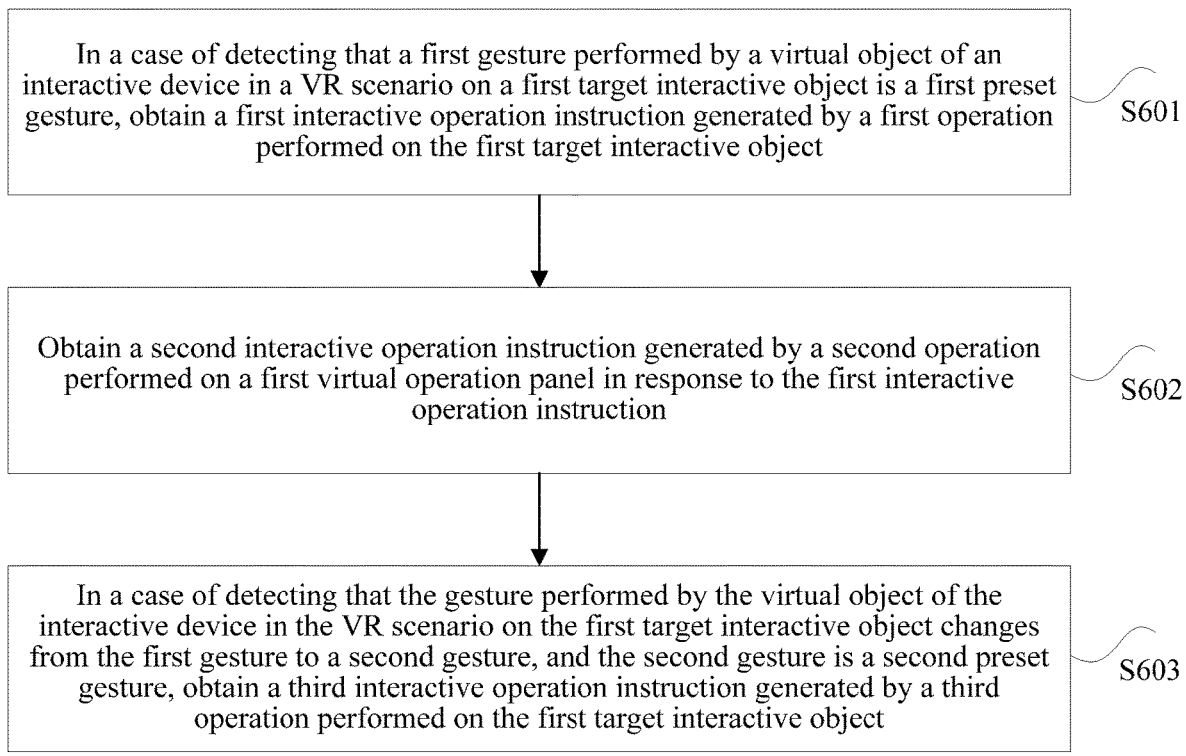
FIG. 6 is a flowchart of a method for obtaining an interactive operation instruction generated by an interactive operation performed by an interactive device on a target interactive object in an interactive object displayed in a first virtual operation panel according to an embodiment of this application.

FIG. 6 is a flowchart of a method for obtaining an interactive operation instruction generated by an interactive operation performed by an interactive device on a target interactive object in an interactive object displayed in a first virtual operation panel according to an embodiment of this application. As shown in FIG. 6, the method includes the following steps.

Step S601. In a case of detecting that a first gesture performed by a virtual object of an interactive device in a VR scenario on a first target interactive object is a first preset gesture, obtain a first interactive operation instruction generated by a first operation performed on the first target interactive object.

In the technical solution provided in the foregoing step S601 in this embodiment of this application, in a case of detecting that the first gesture performed by the virtual object of the interactive device in the VR scenario on the first target interactive object is a first preset gesture, the first interactive operation instruction generated by the first operation performed on the first target interactive object is obtained, where the interactive operation instruction includes the first interactive operation instruction, the first interactive operation instruction is used for triggering a target event of preparing for moving the first virtual operation panel, and the target interactive object includes the first target interactive object.

After the first virtual operation panel corresponding to the first target operation instruction is selected and displayed from the plurality of virtual operation panels in the VR scenario, a collider of the virtual object enters a panel collider. Whether the first gesture performed by the virtual object on the first target interactive object is a first preset gesture is detected. The first target interactive object may be any interactive region in the first virtual operation panel, and the first preset gesture may be a grasp gesture. That is, as long as the virtual object performs the touch operation on the first virtual operation panel, whether the first gesture is a grasp gesture is detected. In a case that the first gesture is a first preset gesture, a first operation instruction generated by a first operation performed on the first target object is obtained. The first operation is a grasp operation of the virtual object. The user may press a grasp button disposed on the interactive device to control the virtual object to perform a grasp operation on the first virtual operation panel. The target event of preparing for moving the first virtual operation panel is executed in the VR scenario in response to the first interactive operation instruction, that is, the first virtual operation panel is in a movable state in the VR scenario, instead of being fixed in the VR scenario.

Step S602. Obtain a second interactive operation instruction generated by a second operation performed on a first virtual operation panel in response to the first interactive operation instruction.

In the technical solution provided in the foregoing step S602 in this embodiment of this application, after the first interactive operation instruction is responded to, the second interactive operation instruction generated by the second operation performed on the first virtual operation panel is obtained, where the interactive operation instruction includes the second interactive operation instruction, the second interactive operation instruction is used for triggering a target event that the first virtual operation panel moves as the virtual object of the interactive device in the VR scenario moves.

After the first interactive operation instruction is responded to, the first virtual operation panel may move in the VR scenario. The second interactive operation instruction generated by the second operation performed on the first virtual operation panel is obtained. The second operation is a moving operation of the virtual object. The user may press the grasp button disposed on the interactive device all the time to control the virtual object to perform the moving operation on the first virtual operation panel. The target event that the first virtual operation panel moves as the virtual object of the interactive device in the VR scenario moves triggered by the second operation instruction is executed in the VR scenario in response to the second operation instruction, so that the first virtual operation panel moves in the VR scenario according to the operation of the user for the interactive device, instead of being fixed in the VR scenario.

Step S603. In a case of detecting that the gesture performed by the virtual object of the interactive device in the VR scenario on the first target interactive object changes from the first gesture to a second gesture, and the second gesture is a second preset gesture, obtain a third interactive operation instruction generated by a third operation performed on the first target interactive object.

In the technical solution provided in the foregoing step S603 in this embodiment of this application, in a case that it is detected that the gesture performed by the virtual object of the interactive device in the VR scenario on the first target interactive object changes from the first gesture to the second gesture, and the second gesture is a second preset gesture, the third interactive operation instruction generated by the third operation performed on the first target interactive object is obtained, where the interactive operation instruction includes the third interactive operation instruction, and the third interactive operation instruction is used for triggering a target event that the virtual object of the interactive device in the VR scenario stops moving the first virtual operation panel.

In a moving process of the first virtual operation panel in the VR scenario, whether the gesture performed by the virtual object on the first target interactive object changes, and whether the gesture changes from the first gesture to the second gesture are detected. The second gesture is a second preset gesture, for example, the second preset gesture is a loosening gesture of the target object. If the gesture changes from the first gesture to the second preset gesture, the third interactive operation instruction generated by the third operation performed on the first target interactive object is obtained. The third operation may be a loosening operation, that is, a release operation on the first virtual operation panel. The user may loosen the grasp button disposed on the interactive device all the time to control the virtual object to perform the release operation on the first virtual operation panel. The target event that the virtual object of the interactive device in the VR scenario stops moving the first virtual operation panel triggered by the third interactive operation instruction is executed in the VR scenario in response to the third interaction instruction, so that the first virtual operation panel remains at the position when the gesture performed by the virtual object on the first target interactive object is the second gesture.

In this embodiment, in a case that it is detected that the first gesture performed by the virtual object of the interactive device in the VR scenario on the first target interactive object is a first preset gesture, the first interactive operation instruction generated by the first operation performed on the first target interactive object is obtained, to trigger the target event of preparing for moving the first virtual operation panel; the second interactive operation instruction generated by the second operation performed on the first virtual operation panel is obtained, to trigger the target event that the first virtual operation panel moves as the virtual object of the interactive device in the VR scenario moves; in a case that it is detected that the gesture performed by the virtual object of the interactive device in the VR scenario on the first target interactive object changes from the first gesture to the second preset gesture, the third interactive operation instruction generated by the third operation performed on the first target interactive object is obtained, and the target event that the virtual object of the interactive device in the VR scenario stops moving the first virtual operation panel is triggered, so that the first virtual operation panel may be disposed on an interactive region in the VR scenario according to needs of the user, the first virtual operation panel may be prevented from blocking the sight of the user, and users can develop their own operation habits, thereby improving operation flexibility of the virtual operation panel.

In an optional embodiment, step S408 of executing a target event corresponding to the target interactive object in the VR scenario in response to the interactive operation instruction includes: obtaining second position information of the interactive device during generating of the third interactive operation instruction; determining a region including a second position in the VR scenario as a target display region of the first virtual operation panel; and displaying the first virtual operation panel in the target display region.

Figure 7:
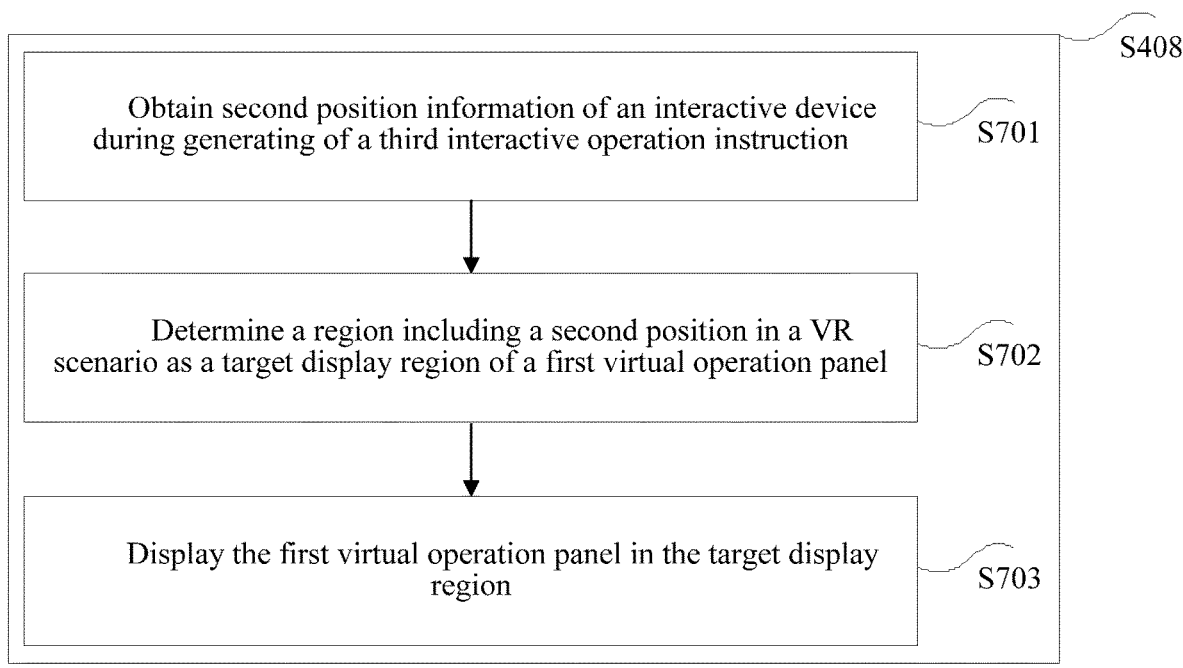
FIG. 7 is a flowchart of another method for executing a target event corresponding to a target interactive object in a VR scenario according to an embodiment of this application.

FIG. 7 is a flowchart of another method for executing a target event corresponding to a target interactive object in a VR scenario according to an embodiment of this application. As shown in FIG. 7, the method includes the following steps.

Step S701. Obtain second position information of an interactive device during generating of a third interactive operation instruction.

In the technical solution provided in the foregoing step S701 in this embodiment of this application, the second position information of the interactive device is obtained during generating of the third interactive operation instruction, where the second position information is used for indicating a second position of a virtual object of the interactive device in the VR scenario.

After the third interactive operation instruction generated by the third operation performed on the first target interactive object is obtained, the second position information of the interactive device during generating of the third interactive operation instruction is obtained. The second position information is used for indicating the second position of the virtual object corresponding to the interactive device in the VR scenario. For example, after a release operation instruction generated by a release operation performed on the first virtual operation panel is obtained, a second position of a virtual hand corresponding to the interactive device during generating of the release operation instruction is obtained.

Step S702. Determine a region including the second position in the VR scenario as a target display region of the first virtual operation panel.

In the technical solution provided in the foregoing step S702 in this embodiment of this application, the region including the second position in the VR scenario is determined as the target display region of the first virtual operation panel.

After the second position information is obtained, the region including the second position in the VR scenario is determined. The region is the target display region of the first virtual operation panel. The size of the target display region is larger than the size of the first virtual operation panel, so that content on the first virtual operation panel may be completely displayed.

Step S703. Display the first virtual operation panel in the target display region.

In the technical solution provided in the foregoing step S703 in this embodiment of this application, after the target display region of the first virtual operation panel is determined, the first virtual operation panel is displayed in the target display region, where the target event includes the event of displaying the first virtual operation panel in the target display region.

In this embodiment, the second position information of the interactive device is obtained during generating of the third interactive operation instruction, where the second position information is used for indicating the second position of the virtual object of the interactive device in the VR scenario; the region including the second position in the VR scenario is determined as the target display region of the first virtual operation panel; and the first virtual operation panel is displayed in the target display region, thereby achieving the objective of executing the target event corresponding to the target interactive object in the VR scenario in response to the interactive operation instruction.

In an optional embodiment, in step S602, during the obtaining the second interactive operation instruction performed on a second operation performed by the first virtual operation panel, the method further includes: controlling the first virtual operation panel to be towards a preset direction in a moving process in the VR scenario.

In this embodiment, when the second interactive operation instruction generated by the second operation performed on the first virtual operation panel is obtained, that is, when the first virtual operation panel moves as the virtual object of the interactive device in the VR scenario moves, the first virtual operation panel is controlled to be towards a preset direction in a moving process in the VR scenario. Optionally, in the moving process, the first virtual operation panel is always in a direction of the head of the user, so that the user may clearly see the content displayed on the first virtual operation panel, until the user controls, by using the interactive device, the virtual object to release the first virtual operation panel, and the first virtual operation panel remains at a new spatial position at which it remains during the release. Then the process ends.

In an optional embodiment, in step S408, before the interactive operation instruction is responded to, the method further includes: obtaining a second target operation instruction in the VR scenario; selecting and displaying at least one second virtual operation panel corresponding to the second target operation instruction from the plurality of virtual operation panels in the VR scenario; and obtaining an interactive operation instruction generated by an interactive operation performed by the interactive device on a target interactive object in an interactive object displayed in the first virtual operation panel and the at least one second virtual operation panel.

Figure 8:
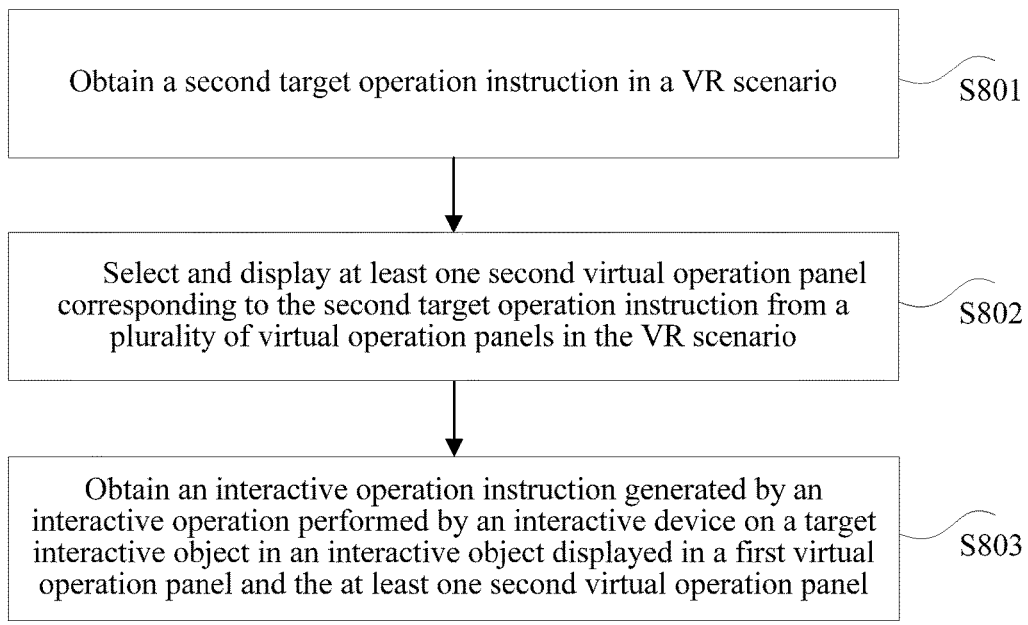
FIG. 8 is a flowchart of another information interaction method according to an embodiment of this application.

FIG. 8 is a flowchart of another information interaction method according to an embodiment of this application. As shown in FIG. 8, the method further includes the following steps.

Step S801. Obtain a second target operation instruction in a VR scenario.

In the technical solution provided in the foregoing step S801 in this embodiment of this application, the second target operation instruction is obtained in the VR scenario.

This embodiment supports simultaneous display of a plurality of virtual operation panels. Before the interactive operation instruction is responded to, the second target operation instruction is obtained in the VR scenario. The second target operation instruction may be an instruction used for selecting a to-be-operated virtual operation panel in addition to the first virtual operation panel in the VR scenario. The user may generate the second target operation instruction by operating an interactive device, for example, moving a rocker on the interactive device, controlling a virtual object in the VR scenario to move, pressing a button on a handle after the to-be-operated virtual operation panel is determined, and controlling the virtual object to click the virtual operation panel, thereby generating the second target operation instruction.

Step S802. Select and display at least one second virtual operation panel corresponding to the second target operation instruction from a plurality of virtual operation panels in the VR scenario.

In the technical solution provided in the foregoing step S802 in this embodiment of this application, the at least one second virtual operation panel corresponding to the second target operation instruction is selected and displayed from the plurality of virtual operation panels in the VR scenario.

In this embodiment, a plurality of virtual operation panels is disposed in the VR scenario, and the plurality of virtual operation panels are independently displayed, and may display different content.

After the second target operation instruction is obtained, the at least one second virtual operation panel corresponding to the second target operation instruction is selected and displayed from the plurality of virtual operation panels in the VR scenario. After the second target operation instruction is generated by using the interactive device, at least one second virtual operation panel corresponding to the second target operation instruction may be selected and displayed from the plurality of virtual operation panels in response to the second target operation instruction. Optionally, when the virtual object is controlled by using the interactive device to touch the virtual operation panel, it is determined that the second virtual operation panel in the plurality of virtual operation panels is selected, or when the virtual object is controlled by using the interactive device to touch a preset selected button on the virtual operation panel, it is determined that the second virtual operation panel in the plurality of virtual operation panels is selected, and the second virtual operation panel is displayed to display content of the second virtual operation panel.

Optionally, the first virtual operation panel and the at least one second virtual operation panel may be virtual operation panels having an association relationship, and may be the same type of virtual operation panels, for example, social virtual operation panels, virtual operation panels including an email system, virtual operation panels of a friend system, and virtual operation panels configured for communication.

Step S803. Obtain an interactive operation instruction generated by an interactive operation performed by the interactive device on a target interactive object in an interactive object displayed in the first virtual operation panel and the at least one second virtual operation panel.

In the technical solution provided in the foregoing step S803 in this embodiment of this application, the interactive operation instruction generated by the interactive operation performed by the interactive device on the target interactive object in the interactive object displayed in the first virtual operation panel and the at least one second virtual operation panel is obtained.

After the at least one second virtual operation panel corresponding to the second target operation instruction is selected and displayed from the plurality of virtual operation panels in the VR scenario, the interactive operation instruction generated by the interactive operation performed by the interactive device on the target interactive object in the interactive object displayed in the first virtual operation panel and the at least one second virtual operation panel is obtained. Because the first virtual operation panel and the at least one second virtual operation panel have an association relationship, the plurality of virtual operation panels may be mutually combined, and may meet at any time an interactive operation that the user needs to implement in an interactive operation process, to enhance interactive experience of the user in the interactive operation process, so that the user can select the virtual operation panel flexibly, and further switch between different virtual operation panels and different interactive operation functions, thereby improving operation flexibility of the virtual operation panel.

In this embodiment, before the interactive operation instruction is responded to, the second target operation instruction is obtained in the VR scenario; the at least one second virtual operation panel corresponding to the second target operation instruction is selected and displayed from the plurality of virtual operation panels in the VR scenario; and the interactive operation instruction generated by the interactive operation performed by the interactive device on the target interactive object in the interactive object displayed in the first virtual operation panel and the at least one second virtual operation panel is obtained, thereby improving operation flexibility of the virtual operation panel.

In an optional embodiment, step S406 of obtaining an interactive operation instruction generated by an interactive operation performed by the interactive device on a target interactive object in an interactive object displayed in the first virtual operation panel includes: obtaining a fourth interactive operation instruction generated by an interactive operation performed by the interactive device on a third target interactive object displayed in the first virtual operation panel; and step S408 of executing a target event corresponding to the target interactive object in the VR scenario in response to the interactive operation instruction includes: executing a target event of closing the first virtual operation panel triggered by the fourth interactive operation instruction in the VR scenario in response to the fourth interactive operation instruction.

Figure 9:
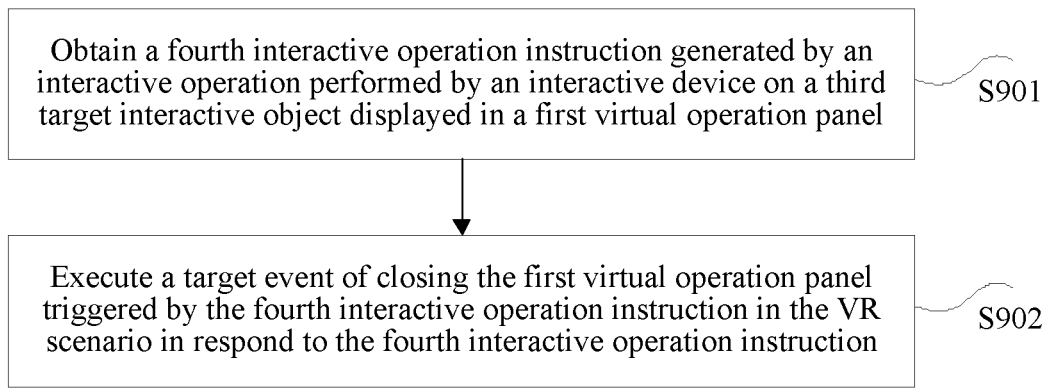
FIG. 9 is a flowchart of another information interaction method according to an embodiment of this application.

FIG. 9 is a flowchart of another information interaction method according to an embodiment of this application. As shown in FIG. 9, the method includes the following steps.

Step S901. Obtain a fourth interactive operation instruction generated by an interactive operation performed by an interactive device on a third target interactive object displayed in a first virtual operation panel.

In the technical solution provided in the foregoing step S901 in this embodiment of this application, the fourth interactive operation instruction generated by the interactive operation performed by the interactive device on the third target interactive object displayed in the first virtual operation panel is obtained, where the target interactive object includes the third target interactive object, the interactive operation instruction includes the fourth interactive operation instruction, and the fourth interactive operation instruction is used for triggering a target event of closing the first virtual operation panel.

The first virtual operation panel includes the third target interactive object, which may be a target interactive object having a "×" mark, to indicate that the first virtual operation panel may be closed by using a virtual object (such as a virtual hand) of the interactive device in the VR scenario. For example, the virtual object performs a touch operation on the "×" mark in the top right corner of the first virtual operation panel, to generate the fourth interactive operation instruction, to trigger the target event of closing the first virtual operation panel.

Step S902. Execute a target event of closing the first virtual operation panel triggered by the fourth interactive operation instruction in the VR scenario in respond to the fourth interactive operation instruction.

In the technical solution provided in the foregoing step S902 in this embodiment of this application, the target event of closing the first virtual operation panel triggered by the fourth interactive operation instruction is executed in the VR scenario in response to the fourth interactive operation instruction.

After the fourth interactive operation instruction generated by the interactive operation performed by the interactive device on the third target interactive object is obtained, and the target event of closing the first virtual operation panel triggered by the fourth interactive operation instruction is executed in the VR scenario in response to the fourth interactive operation instruction, to close the first virtual operation panel.

Optionally, an OptExitComponent encapsulates the close function of the virtual operation panel, and the user may click the OptExitComponent by using the virtual object of the interactive device in the VR scenario, to destroy the entire virtual operation panel in the VR scenario.

In this embodiment, the fourth interactive operation instruction generated by the interactive operation performed by the interactive device on the third target interactive object displayed in the first virtual operation panel, and the target event of closing the first virtual operation panel triggered by the fourth interactive operation instruction is executed in the VR scenario in response to the fourth interactive operation instruction, to close the first virtual operation panel.

In an optional embodiment, in step S404, before the selecting and displaying a first virtual operation panel corresponding to the first target operation instruction from a plurality of virtual operation panels in the VR scenario, the method further includes: obtaining a 2D interface including an interactive object; and combining the 2D interface and a mesh model in the VR scenario, to obtain the first virtual operation panel.

Figure 10:
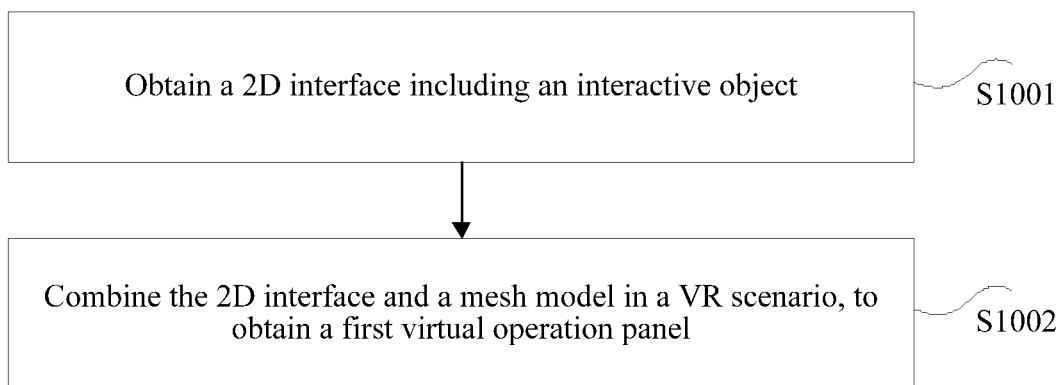
FIG. 10 is a flowchart of another information interaction method according to an embodiment of this application.

FIG. 10 is a flowchart of another information interaction method according to an embodiment of this application. As shown in FIG. 10, the method further includes the following steps.

Step S1001. Obtain a 2D interface including an interactive object.

In the technical solution provided in the foregoing step S1001 in this embodiment of this application, before the first virtual operation panel corresponding to the first target operation instruction is selected and displayed from the plurality of virtual operation panels in the VR scenario, the 2D interface including the interactive object is obtained.

Before the first virtual operation panel corresponding to the first target operation instruction is selected and displayed from the plurality of virtual operation panels in the VR scenario, a 2D UI (UMG Widget) including an interactive object is obtained.

Step S1002. Combine the 2D interface and a mesh model in a VR scenario, to obtain a first virtual operation panel.

In the technical solution provided in the foregoing step S1002 in this embodiment of this application, the 2D interface and the mesh model in the VR scenario are combined, to obtain the first virtual operation panel, where the mesh model is configured to mark a region used for executing an interactive operation in the VR scenario.

After the 2D interface including the interactive object is obtained, the 2D interface may be combined with the mesh model in the VR scenario by using a preset component, to obtain the first virtual operation panel. For example, if the preset component is a WidgetComponent, and the mesh model is a 3D mesh, the 2D UI is attached on the 3D mesh by using the WidgetComponent. After the 2D UI including the interactive object is attached on the 3D mesh, the user may control, by using the interactive device, the virtual object in the virtual scenario to interact with the 2D UI, and the size of the 3D mesh is determined by the size of the 2D UI.

In this embodiment, before the first virtual operation panel corresponding to the first target operation instruction is selected and displayed from the plurality of virtual operation panels in the VR scenario, the 2D interface including the interactive object is obtained; and the 2D interface and the mesh model in the VR scenario are combined to implement the first virtual operation panel configured to perform an interactive operation in the VR scenario, thereby achieving the effect of integrating the original 2D UI into an entity mesh model in the scenario perfectly.

In an optional embodiment, step S406 of obtaining an interactive operation instruction generated by an interactive operation performed by an interactive device on a target interactive object in an interactive object displayed in the first virtual operation panel includes: obtaining, in a case that a collider of the first virtual operation panel and a collider of the virtual object of the interactive device in the VR scenario intersect, the interactive operation instruction performed by the interactive device on the target interactive object in the interactive object displayed in the first virtual operation panel.

The interactive operation instruction is generated in a case that the collider of the first virtual operation panel and the collider of the virtual object of the interactive device in the VR scenario intersect, and the following interactive operations are detected on each frame: first, if the virtual object clicks a 2D UI mounted on a 3D mesh, whether some logic events of the UI are triggered, for example, an event of pressing a button is triggered, is determined according to a detected position clicked by the virtual object; second, if the virtual object clicks the close button, a destruction logic of the panel is triggered, and after this step is completed, the entire logic interacting with the panel cuts off; third, if the user wants to adjust the position of the panel, a grasp operation of the virtual object is triggered, the virtual operation panel moves as the virtual object moves in the spatial position, and the virtual operation panel always rotates towards the direction of the head of the user, so that the user can always clearly see the content displayed on the virtual operation panel, until the virtual object is controlled to release the virtual operation panel, and the virtual operation panel remains at a new spatial position; and fourth, if the virtual object is controlled to leave the interactive region of the virtual operation panel, the interactive operation logic is no longer executed.

In this embodiment, the OptInteractiveComponent is also a 3D mesh, configured to mark which relative space in the VR scenario may collide with the virtual object (such as the virtual hand) of the interactive device in the VR scenario, and an implementation logic of a collision event may be implemented by using the InteractiveBaseComponent.

In an optional embodiment, the size of each of the plurality of virtual operation panels is determined by the target interactive object displayed on each virtual operation panel, that is, the size of each virtual operation panel in the VR scenario is determined according the amount of the content.

In this embodiment, in a process of playing a game, options of the menu can be used without pausing the game, to improve operation flexibility of the menu panel, so that users can develop their own operation habits.

The following describes the technical solutions of this application with reference to optional embodiments. An example in which the virtual object of the interactive device in the VR scenario is a virtual hand is used for description.

Figure 11:
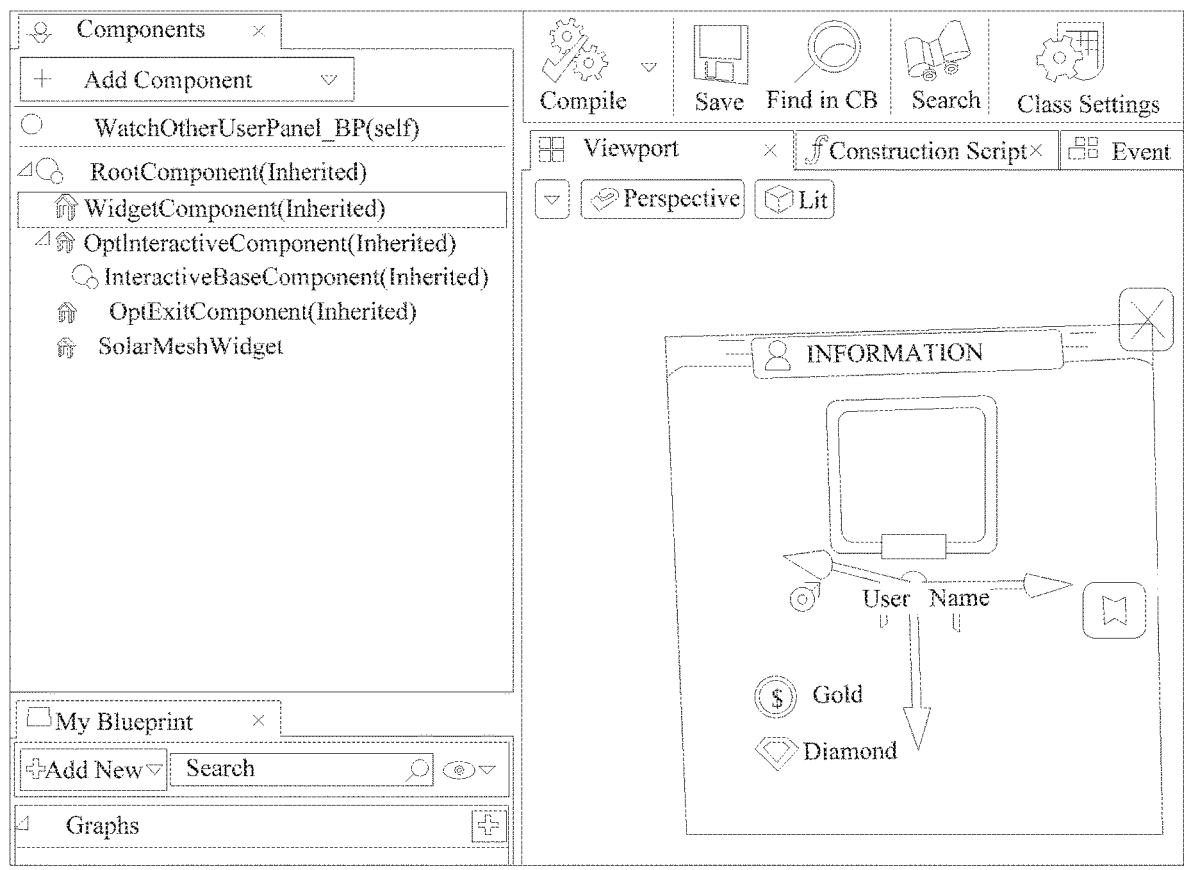
FIG. 11 is a schematic diagram of an implementation structure of a single panel according to an embodiment of this application.

FIG. 11 is a schematic diagram of an implementation structure of a single panel according to an embodiment of this application. FIG. 11 shows an implementation structure of an INFORMATION panel. The panel component is the column of left components, mainly including: a RootComponent, a WidgetComponent, an OptInteractiveComponent, an InteractiveBaseComponent, an OptExitComponent, and a SolarMeshWidget component from top to bottom sequentially.

The RootComponent is a root node, which is not endowed with a logic; the WidgetComponent (inherited) is a component implemented in this embodiment and configured to attach a conventional 2D user interface (2D UI) (by using a universal media gateway widget (UMG Widget)) on an entity mesh model (3D mesh), and after the 2D UI is attached on the 3D Mesh, the user may interact with the 2D UI by using the interactive device, and the size of the entity mesh model (3D mesh) may be determined by the size of the 2D UI; the OptInteractiveComponent is also a 3D mesh, configured to mark which relative space in the VR scenario may collide with the interactive device, and an implementation logic of a collision event may be implemented in the InteractiveBaseComponent; the OptExitComponent is configured to encapsulate a close function of a menu panel, and when the user clicks the component by using the interactive device, objects on the entire menu panel are destroyed; the SolarMeshWidget is an additional component, that is, some additional components may be added on the menu panel on the basis of the foregoing components according to needs, so that the menu panel has stronger functions, but the WidgetComponent (inherited) needs to mark basic functions, thereby meeting basic display (2D UI display) on the menu panel and implementing interactions between the basic functions, where the interactions between the basic functions may be an operation clicking function, an operation closing function, and a position adjusting operation function on the UI, which are not limited herein.

In this embodiment, the original 2D UI is further perfectly integrated into the entity mesh model in the VR scenario. Meanwhile, interactive experience of a sense of touch is brought to users, to increase immersive feelings to the users.

In the implementation structure of the single panel in this embodiment, other information in addition to the foregoing information is only exemplary, and it does not mean that the solutions in this embodiment of this application are limited.

The following describes the operation logic of the menu panel.

Figure 12:
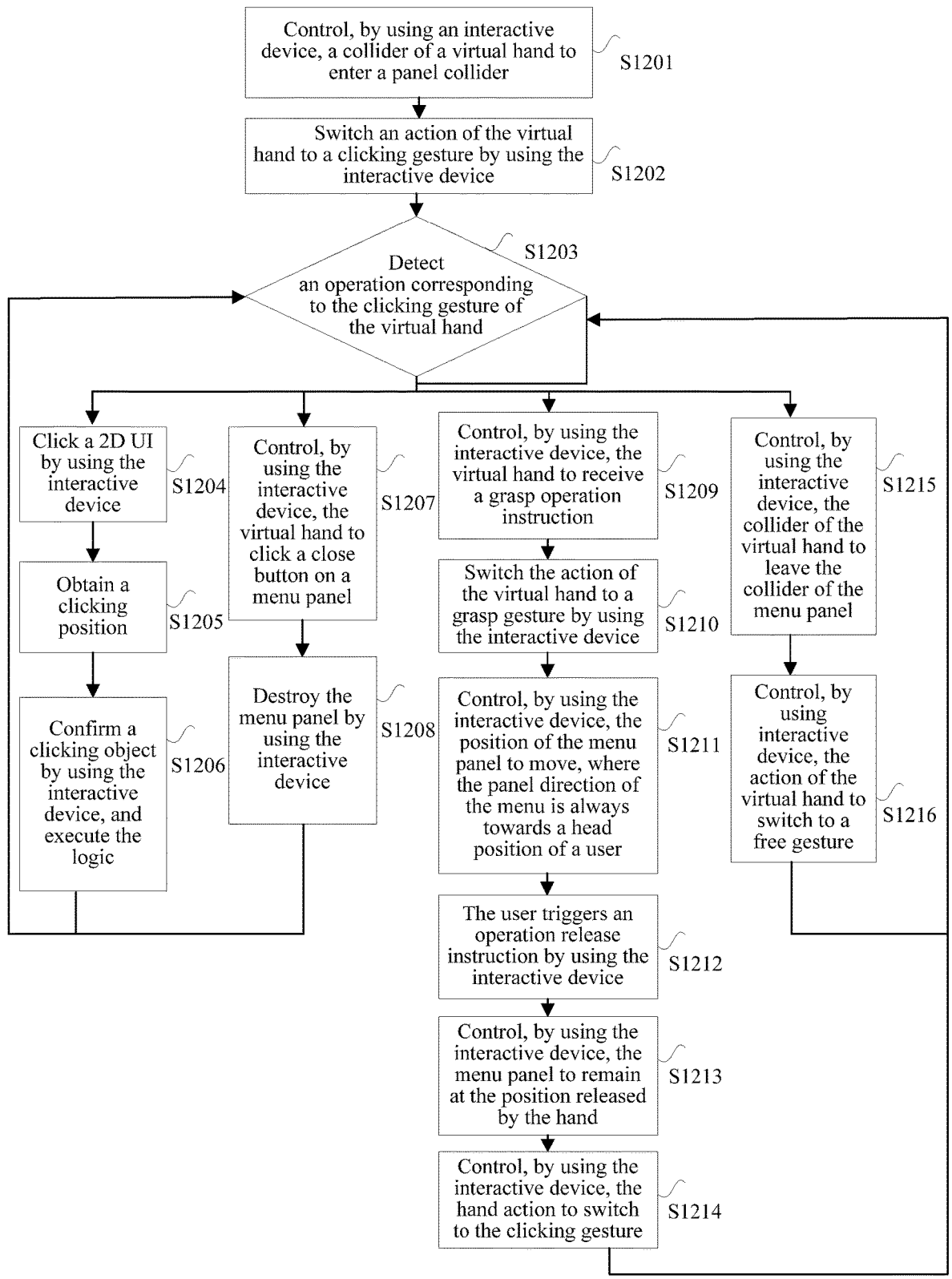
FIG. 12 is a flowchart of another information interaction method according to an embodiment of this application.

FIG. 12 is a flowchart of another information interaction method according to an embodiment of this application. As shown in FIG. 12, the method includes the following steps.

Step S1201. Control, by using an interactive device, a collider of a virtual hand to enter a panel collider.

In this embodiment, a logic implementation method operated by the user by using the interactive device is displayed. All logic detections are performed when the user controls, by using the interactive device, the collider of the virtual hand and a collider of a menu panel to intersect. The virtual hand is a virtual object of the interactive device in the VR scenario. The collider of the virtual hand enters the panel collider by using the interactive device.

Step S1202. Switch an action of the virtual hand to a clicking gesture by using the interactive device.

After a hand collider enters the panel collider by using the interactive device, the user switches the action of the virtual hand to the clicking gesture by using keys configured to execute the clicking gesture on the interactive device.

Step S1203. Detect an operation corresponding to the clicking gesture of the virtual hand.

After the action of the virtual hand is switched to the clicking gesture by using the interactive device, the operation corresponding to the clicking gesture of the virtual hand is detected.

Step S1204. Click a 2D UI by using the interactive device.

The 2D UI attached on the 3D mesh is clicked by using the interactive device.

Step S1205. Obtain a clicking position.

The clicking position is obtained after the 2D UI is clicked by using the interactive device.

Step S1206. Confirm a clicking object by using the interactive device, and execute the logic.

After the clicking position is obtained, the clicking object is confirmed according to the detected clicking position, and whether some logic events of the UI are triggered is determined. For example, whether an event of pressing a button is triggered is determined, and the logic is executed. After the clicking object is confirmed by using the interactive device, and the logic is executed, step S1203 may be performed again, to detect the operation corresponding to the clicking gesture of the virtual hand.

Step S1207. Control, by using the interactive device, the virtual hand to click a close button on the menu panel.

Step S1208. Destroy the menu panel by using the interactive device.

After the button is closed by using the interactive device, the operation instruction corresponding to the destruction logic of the menu panel is triggered, and after the operation instruction is responded to, the entire interaction logic with the menu panel ends, and the menu panel is destroyed. After the menu panel is destroyed, step S1203 may be performed again, to detect the operation corresponding to the clicking gesture of the virtual hand.

Step S1209. Control, by using the interactive device, the virtual hand to receive a grasp operation instruction.

After the operation corresponding to the clicking gesture of the virtual hand is detected, when the user wants to adjust the position of the menu panel in the VR scenario by using the interactive device, the virtual hand is controlled by using the interactive device to trigger an operation instruction used for grasping the menu panel.

Step S1210. Switch the action of the virtual hand to a grasp gesture by using the interactive device.

After the grasp operation instruction is received by using the interactive device, the action of the virtual hand is switched to the grasp gesture in response to the operation instruction.

Step S1211. Control, by using the interactive device, the position of the menu panel to move, where the panel direction of the menu is always towards a head position of a user.

After the action of the virtual hand is switched to the grasp gesture by using the interactive device, the position of the menu panel is controlled by using the interactive device to move, so that the menu panel moves as the virtual hand of the interactive device in the virtual scenario moves, and the direction of the menu panel is always towards the head position of the user, that is, the user can always clearly see the content displayed on the menu panel.

Step S1212. The user triggers an operation release instruction by using the interactive device.

Step S1213. Control, by using the interactive device, the menu panel to remain at the position released by the hand.

After the user triggers the operation release instruction by using the interactive device, the menu panel remains at a new spatial position in the VR scenario, where the spatial position is the position at which the user expects the menu panel to remain in the VR scenario.

Step S1214. Control, by using the interactive device, the hand action to switch to the clicking gesture.

After the menu panel is controlled by using the interactive device to remain at the position released by the hand, the hand action may be controlled by using the interactive device to switch to the clicking gesture. After the hand action is controlled by using the interactive device to switch to the clicking gesture, step S1203 may be performed again, to detect the operation corresponding to the clicking gesture of the virtual hand.

Step S1215. Control, by using the interactive device, the collider of the virtual hand to leave the collider of the menu panel.

After the operation corresponding to the clicking gesture of the virtual hand is detected, the collider of the virtual hand is controlled by using the interactive device to leave the collider of the menu panel, and the virtual hand leaves the interactive region of the menu panel, so that the operation on the menu panel is no longer performed.

Step S1216. Control, by using interactive device, the action of the virtual hand to switch to a free gesture.

After the hand collider is controlled by using the interactive device to leave the collider of the menu panel, the collider of the virtual hand is controlled by using the interactive device to leave the collider of the menu panel. After the action of the virtual hand is controlled by using the interactive device to switch to the free gesture, step S1203 may be performed again, to detect the operation corresponding to the clicking gesture of the virtual hand.

The foregoing logic detections are all performed by the user when the collider of the virtual object of the interactive device and the collider of the menu panel intersect, and whether the foregoing four cases occur is detected for each frame. In step S1203, after the operation corresponding to the clicking gesture of the virtual hand is detected, if none of the foregoing four cases occur, step S1203 continues to be performed.

In this embodiment, an independently displayed menu panel having different content is disposed in the VR scenario, thereby fully using the advantage of spatial expansion in the VR environment, and avoiding displaying the menu by using a display manner of folding menu content in the 2D space. The menu panel in this embodiment may be disposed at a touchable position around the user, the user may grasp any menu panel by using the interactive device and put the menu panel to a place where the user wants to put, thereby integrating the menu panel and the game scenario, and preventing the menu panel from blocking the sight of the user, so that users can develop their own operation habits. In addition, the content on the menu panel may be triggered by using the touch operation instruction of the interactive device, and a vision and touch vibration feedback is further brought to users, thereby fully using a more natural interaction manner brought by VR, and improving user experience. This embodiment further supports coexistence of a plurality of menu panels, achieving the objective of combination use and quick switch between the menu panels.

For an application environment in this embodiment of this application, reference may be made to, but not limited to, the application environment in the foregoing embodiment, which is not described herein again in this embodiment. The embodiments of this application provide an optional application configured to implement the information interaction method.

Figure 13:
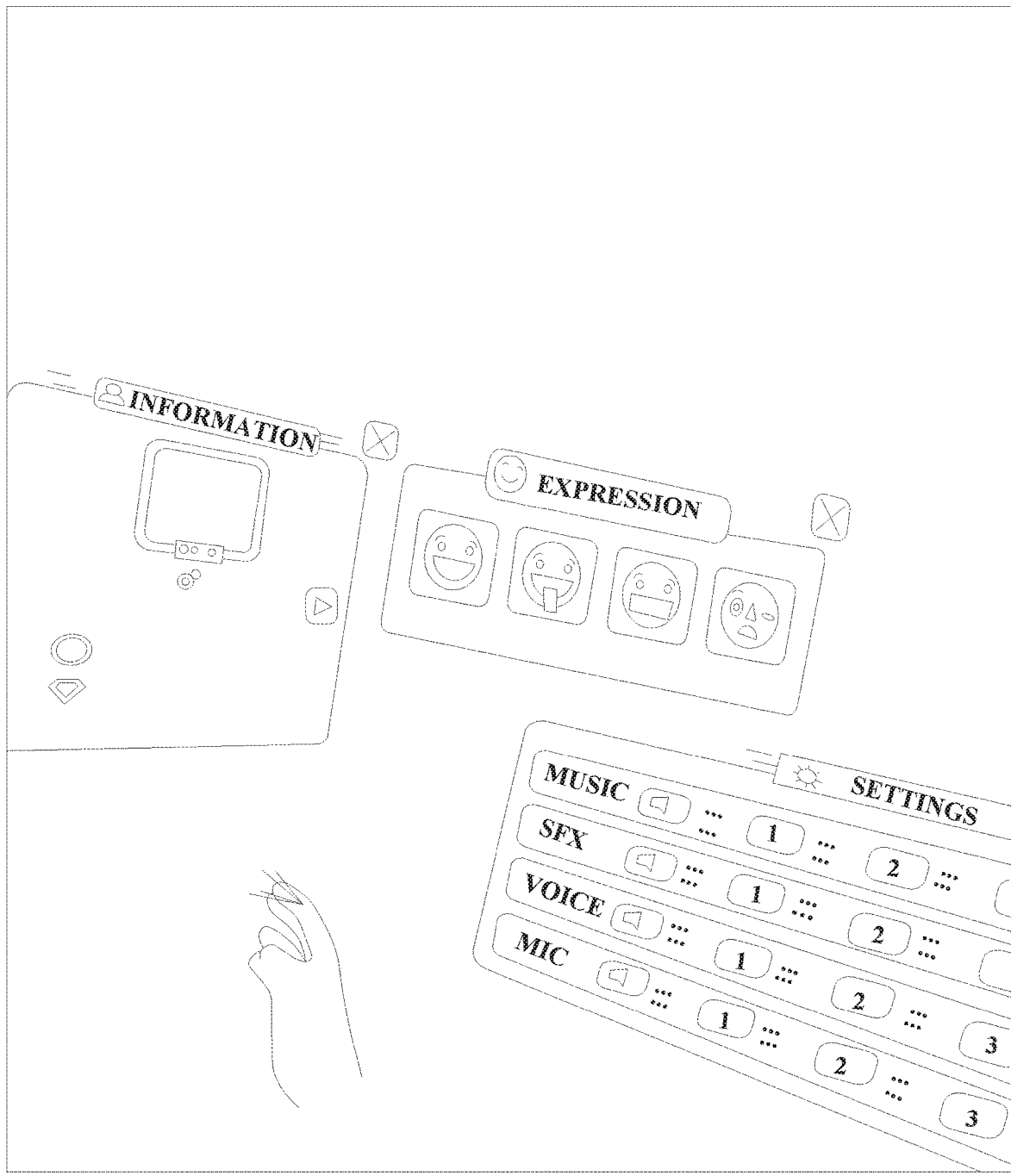
FIG. 13 is a schematic diagram of displaying a menu panel in a VR scenario according to an embodiment of this application.

FIG. 13 is a schematic diagram of menu panel display in a VR scenario according to an embodiment of this application. As shown in FIG. 13, the menu panel is a menu panel displayed when a user actively opens an interface by using an interactive device. Optionally, during opening of the interface, the displayed menu panel is a default menu panel, and the type and quantity of the default menu panels may be preset, for example, an INFORMATION display panel is preset, and may be configured to set displayed information; an EXPRESSION panel, including a plurality types of different expressions, for the user to select; a SETTINGS panel, may be configured to set volume of voice. After the setting, when the user opens the interface by using the interactive device, the information display panel, the expression panel, and the setting panel are independently displayed, for the user to use when the interactive operation is performed by using the interactive device, thereby fully using the advantage of spatial expansion brought by the VR environment, instead of folding the menu content in the 2D space. When the user controls, by using the interactive device, the virtual hand to click the "×" button on the menu panel, the clicked menu panel is destroyed in the VR scenario. The virtual hand is displayed in the VR scenario, and used for indicating the operation of the interactive device.

Figure 14:
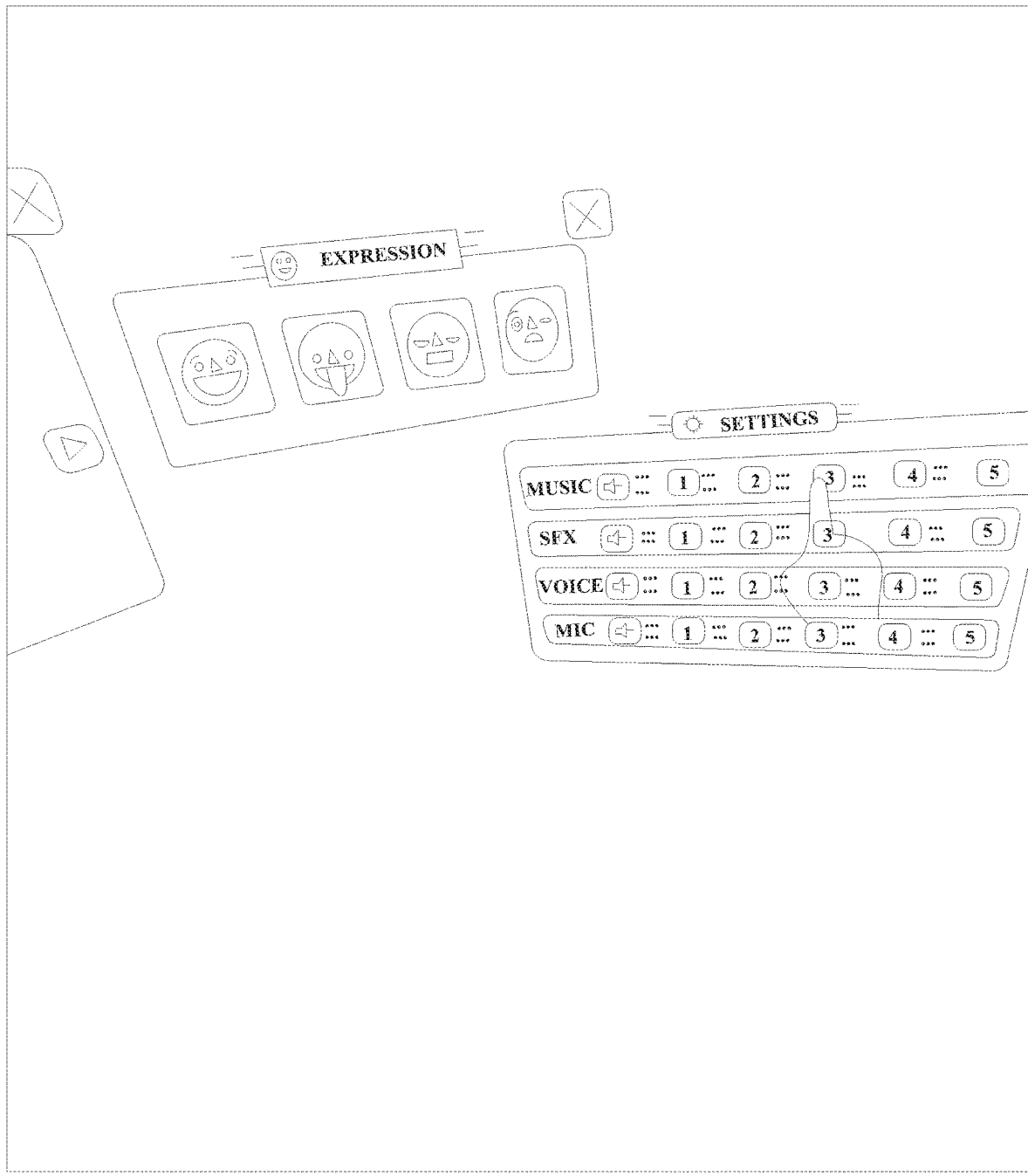
FIG. 14 is a schematic diagram of interacting with a menu panel in a VR scenario according to an embodiment of this application.

FIG. 14 is a schematic diagram of interacting with a menu panel in a VR scenario according to an embodiment of this application. FIG. 14 is a basic operation of a menu panel, and the size of each menu panel is determined by the amount of the content. The menu panel displayed on the menu panel is 2D, and may be a common UMG Widget in a 3D game. That is, the menu panel in this embodiment is completely compatible with the current game making manner. As long as a 2D menu interface is made, the menu interface may be attached on the menu panel in this embodiment, and the user may see the menu panel shown in FIG. 14 in the game and interact with the menu panel by using the virtual hand. Objects used for interactions such as a button of the 2D menu interface may be clicked by controlling fingers of the virtual hand by using the interactive device, to implement the function corresponding to the button.

Figure 15:
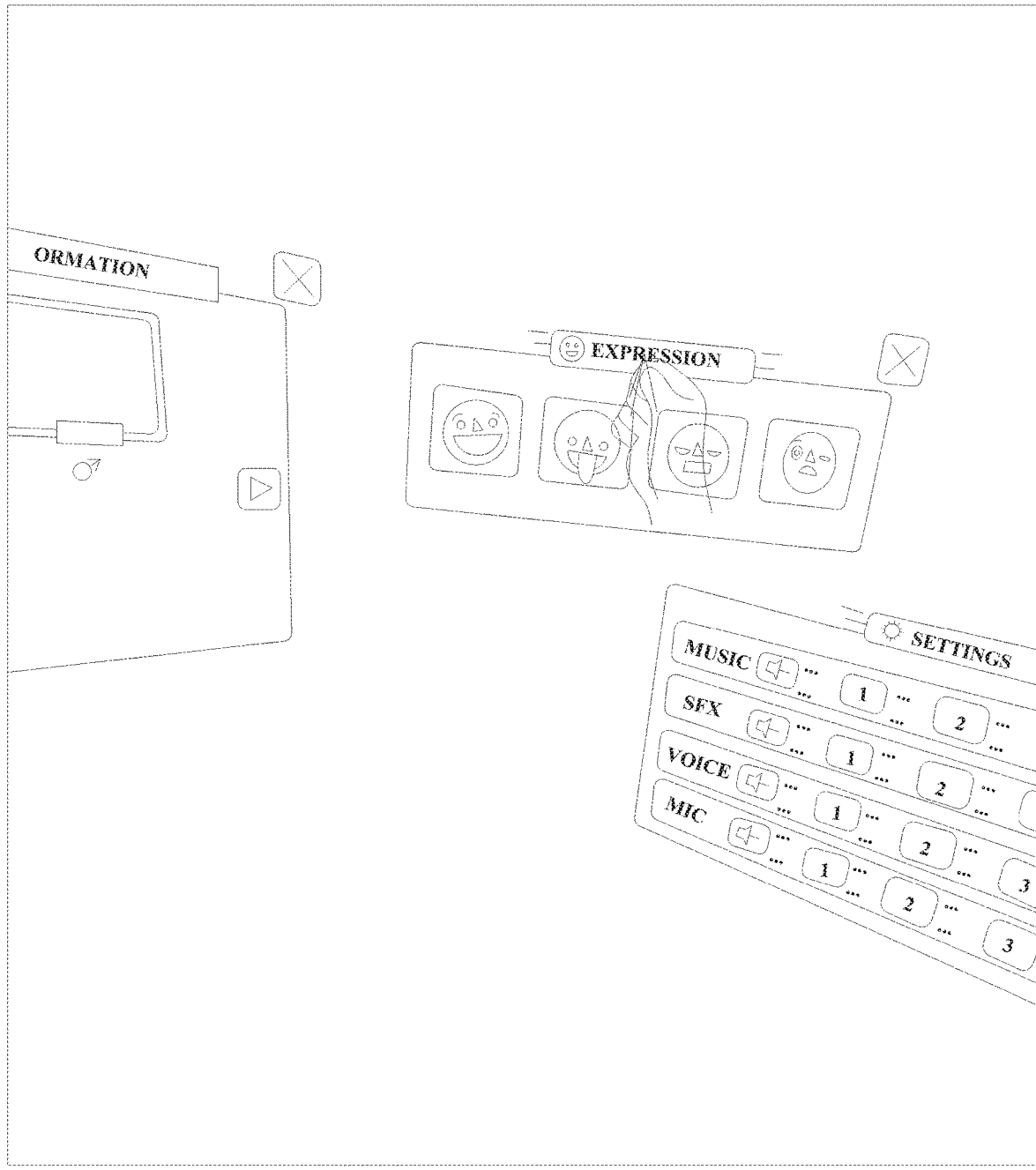
FIG. 15 is a schematic diagram of interacting with a menu panel in another VR scenario according to an embodiment of this application.

FIG. 15 is a schematic diagram of interacting with a menu panel in another VR scenario according to an embodiment of this application. As shown in FIG. 15, the menu panel may be disposed at any touchable place around the user. When the user wants to adjust the position of the menu panel in the VR scenario, the user presses the grasp button on the interactive device, and controls the virtual object to grasp the menu panel. In this case, the virtual menu panel moves as the interactive device controls the virtual object to move in the VR scenario. The user releases the grasp button on the interactive device, to remain the menu panel at a new position in the VR scenario. The new position is the position at which the user expects the menu panel to remain, thereby implementing the position change of the menu panel, and resolving the integration problem of between the menu panel and the game scenario, so that the menu panel in the VR scenario is convenient for the user to touch by using the interactive device, thereby preventing the menu panel from blocking the sight of the user, so that in a process of playing a game, options of the menu can be used without pausing the game, thereby improving operation flexibility of the menu panel, so that users can develop their own operation habits.

In addition, content on all menu panels in this embodiment may be triggered in a manner of controlling the virtual object by using the interactive device to touch, and a vision and touch vibration feedback is further brought to users, thereby fully using a more natural interaction manner brought by VR, and improving user experience. The coexistence of a plurality of menu panels is further supported, so that combination use and quick switch between panels also become possible, and immersive feelings of the users are enhanced.

This embodiment may support Vive and Oculus Touch in hardware, and may support any hand-separated handle that may obtain the position of the 3D space.

The content of the menu panel in this embodiment is not limited, and the visual representation form of the menu panel may also be various, and not limited.

For simple descriptions, the foregoing method embodiments are stated as a series of action combinations. However, a person skilled in the art should know that this application is not limited to the sequence of the described actions because according to this application, some steps may use another sequence or may be simultaneously performed. In addition, a person skilled in the art should also know that all the embodiments described in this specification are optional embodiments, and the related actions and modules are not necessarily required in this application.

Based on the foregoing descriptions of the embodiments, a person skilled in the art may clearly understand that the method in the foregoing embodiments may be implemented by software in addition to a necessary universal hardware platform or by hardware only. However, the former is a better implementation in most cases. Based on such an understanding, the technical solutions of this application essentially or the part contributing to the related technology may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of this application.

Figure 16:
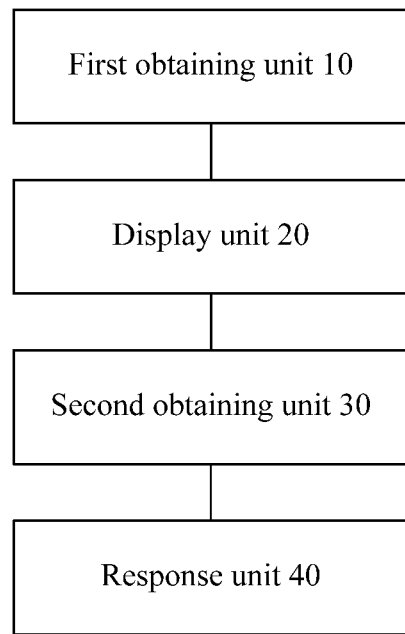
FIG. 16 is a schematic diagram of an information interaction apparatus according to an embodiment of this application.

According to the embodiments of this application, an information interaction apparatus configured to implement the foregoing information interaction method is further provided. FIG. 16 is a schematic diagram of an information interaction apparatus according to an embodiment of this application. As shown in FIG. 16, the apparatus may include: a first obtaining unit 10, a display unit 20, a second obtaining unit 30, and a response unit 40.

The first obtaining unit 10 is configured to obtain a first target operation instruction in a VR scenario.

The display unit 20 is configured to select and display a first virtual operation panel corresponding to the first target operation instruction from a plurality of virtual operation panels in the VR scenario, the plurality of virtual operation panels being displayed mutually independently, and being respectively configured to display different interactive objects.

The second obtaining unit 30 is configured to obtain an interactive operation instruction generated by an interactive operation performed by an interactive device on a target interactive object in an interactive object displayed in the first virtual operation panel, the interactive device being associated with the VR scenario.

The response unit 40 is configured to execute a target event corresponding to the target interactive object in the VR scenario in response to the interactive operation instruction.

The first obtaining unit 10 in this embodiment may be configured to perform step S402 in this embodiment of this application, the display unit 20 in this embodiment may be configured to perform step S404 in this embodiment of this application, the second obtaining unit 30 in this embodiment may be configured to perform step S406 in this embodiment of this application, and the response unit 40 in this embodiment may be configured to perform step S408 in this embodiment of this application.

Figure 1:
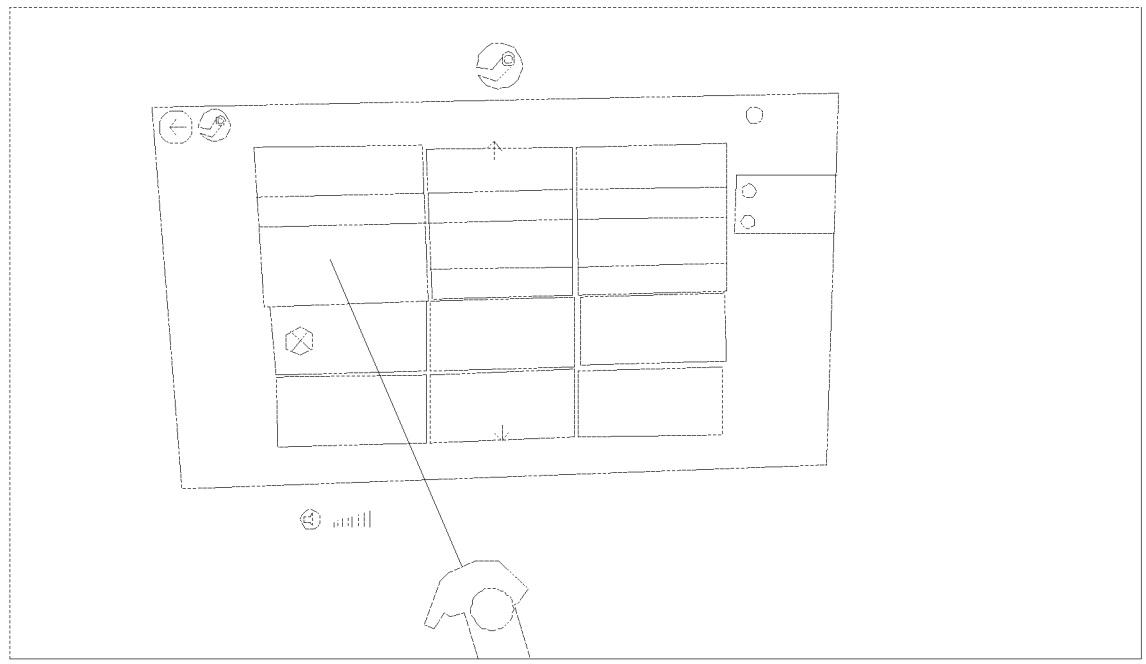
FIG. 1 is a schematic diagram of an interface interaction in a VR environment according to the related technology.
Figure 2:
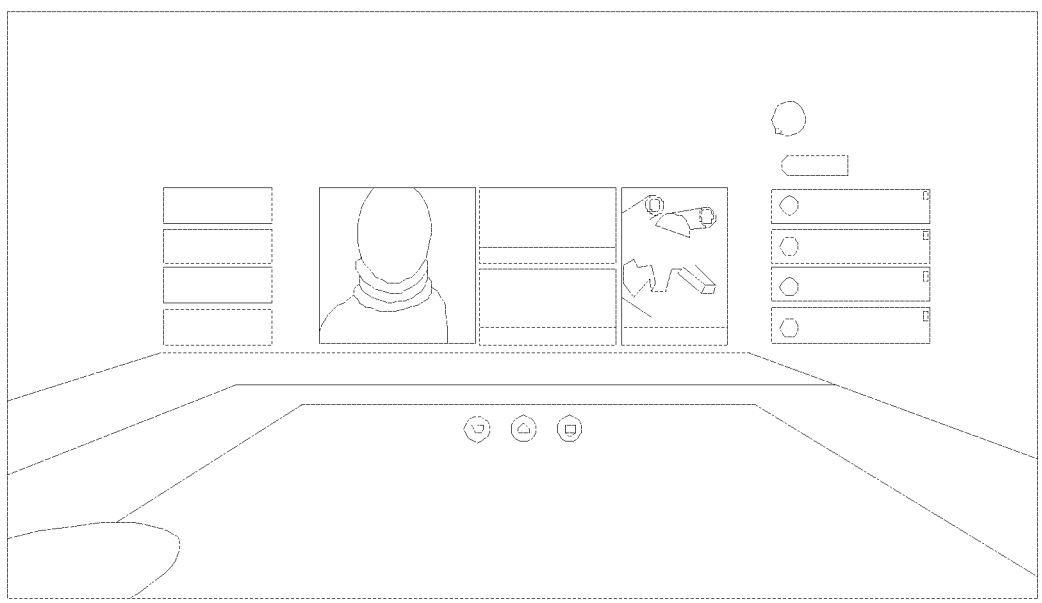
FIG. 2 is a schematic diagram of an interface interaction in another VR environment according to the related technology.

Examples and application scenarios implemented by the foregoing units and corresponding steps are the same but are not limited to the content disclosed in the foregoing embodiments. The foregoing modules may run in the hardware environment shown in FIG. 1 as a part of the apparatus, may be implemented by using software, or may be implemented by using hardware.

In this embodiment, the first obtaining unit 10 obtains a first target operation instruction in a VR scenario; the display unit 20 selects and displays a first virtual operation panel corresponding to the first target operation instruction from a plurality of virtual operation panels in the VR scenario, the plurality of virtual operation panels being displayed mutually independently, and being respectively configured to display different interactive objects; the second obtaining unit 30 obtains an interactive operation instruction generated by an interactive operation performed by an interactive device on a target interactive object in an interactive object displayed in the first virtual operation panel, the interactive device being associated with the VR scenario; and the response unit 40 executes a target event corresponding to the target interactive object in the VR scenario in response to the interactive operation instruction. A plurality of mutually independent virtual operation panels in the VR scenario is respectively configured to display different interactive information, to implement different functions, thereby achieving the objective of operating the virtual operation panel, improving operation flexibility of the virtual operation panel, and further resolving the technical problem of low flexibility information interaction in the related technology.

Examples and application scenarios implemented by the foregoing units and corresponding steps are the same but are not limited to the content disclosed in the foregoing embodiments. The foregoing modules may be run in the hardware environment shown in FIG. 1 as a part of the apparatus, and may be implemented through software, or may be implemented through hardware. The hardware environment includes a network environment.

According to an embodiment of this application, an electronic apparatus configured to implement the foregoing information interaction method is further provided.

Figure 17:
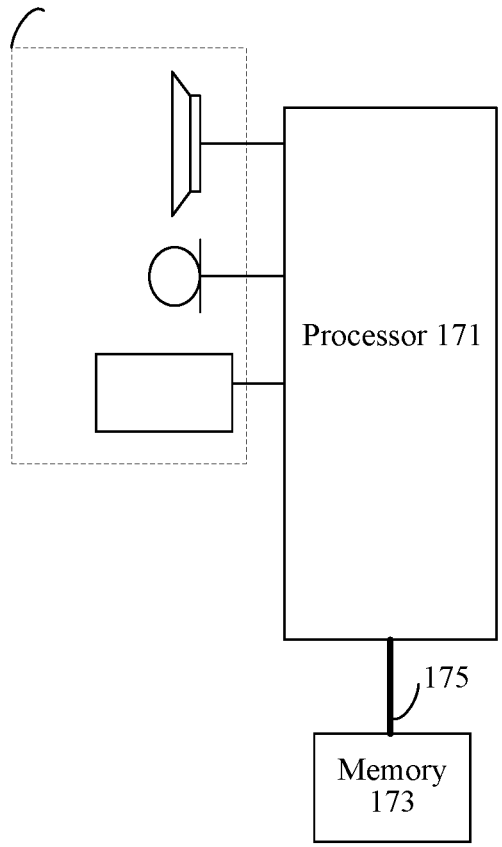
FIG. 17 is a structural block diagram of an electronic apparatus according to an embodiment of this application.

FIG. 17 is a structural block diagram of an electronic apparatus according to an embodiment of this application. As shown in FIG. 17, the electronic apparatus may include: one or more (only one is shown in the figure) processors 171 and memories 173. Optionally, as shown in FIG. 17, the electronic apparatus may further include a transmission apparatus 175 and an input/output device 177.

The memory 173 may be configured to store a software program and a module, for example, a program instruction/module corresponding to an information interaction method and apparatus in the embodiments of this application. The processor 171 performs various functional applications and data processing by running the software program and the module stored in the memory 173, that is, implementing the foregoing information interaction method. The memory 173 may include a high-speed random memory, and may also include a nonvolatile memory such as one or more magnetic storage apparatuses, a flash memory, or another nonvolatile solid-state memory. In some instances, the memory 173 may further include a memory that is remotely disposed relative to the processor 171, and the remote memory may be connected to the electronic apparatus through a network. Examples of the network include, but are not limited to, the Internet, an intranet, a local area network, a mobile communications network, and a combination thereof.

The transmission apparatus 175 is configured to receive or transmit data through a network, and may further be configured for data transmission between the processor and the memory. Examples of the network may include a wired network and a wireless network. In an embodiment, the transmission apparatus 175 includes a network interface controller (NIC) that may be connected to another network device and a router through a network cable, thereby communicating with the Internet or a local area network. In an example, the transmission apparatus 175 is a radio frequency (RF) module, and is configured to wirelessly communicate with the Internet.

Optionally, the memory 173 is configured to store an application program.

The processor 171 may invoke, by using the transmission apparatus 175, the application program stored in the memory 173, so as to perform the following steps:

obtaining a first target operation instruction in a VR scenario;

selecting and displaying a first virtual operation panel corresponding to the first target operation instruction from a plurality of virtual operation panels in the VR scenario, the plurality of virtual operation panels being displayed mutually independently, and being respectively configured to display different interactive objects;

obtaining an interactive operation instruction generated by an interactive operation performed by an interactive device on a target interactive object in an interactive object displayed in the first virtual operation panel, the interactive device being associated with the VR scenario; and executing a target event corresponding to the target interactive object in the VR scenario in response to the interactive operation instruction.

The processor 171 is further configured to perform the following step: obtaining a touch operation instruction generated by a touch operation performed by the interactive device on the target interactive object, where the interactive operation instruction includes the touch operation instruction, and the touch operation instruction is used for triggering the target event corresponding to the target interactive object.

The processor 171 is further configured to perform the following step: obtaining first position information of the interactive device during generating of the touch operation instruction, where the first position information is used for indicating a first position of a virtual object of the interactive device in the VR scenario on the first virtual operation panel; and executing, in a case that the first position information meets a preset condition, the target event corresponding to the target interactive object triggered by the touch operation instruction in the VR scenario.

The processor 171 is further configured to perform the following step: displaying first feedback information in the VR scenario after obtaining the touch operation instruction generated by the touch operation performed by the interactive device on the target interactive object, and/or outputting second feedback information to the interactive device, where the second feedback information is used for instructing the interactive device to perform a target operation.

The processor 171 is further configured to perform the following steps: obtaining a first interactive operation instruction in a case that a first gesture performed on the first target interactive object by a virtual object of the interactive device in the VR scenario is a first preset gesture, where the interactive operation instruction includes the first interactive operation instruction, the first interactive operation instruction is used for triggering a target event of preparing for moving the first virtual operation panel, and the target interactive object includes the first target interactive object; obtaining a second interactive operation instruction after the first interactive operation instruction is responded to, where the interactive operation instruction includes the second interactive operation instruction, and the second interactive operation instruction is used for triggering a target event that the first virtual operation panel moves as the virtual object moves; and obtaining a third interactive operation instruction in a case that the first gesture changes to a second gesture, and the second gesture is a second preset gesture, where the interactive operation instruction includes the third interactive operation instruction, and the third interactive operation instruction is used for triggering the virtual object to stop a target event of moving the first virtual operation panel.

The processor 171 is further configured to perform the following steps: obtaining second position information of the interactive device during generating the third interactive operation instruction, where the second position information is used for indicating a second position of the virtual object of the interactive device in the VR scenario; determining a region including the second position in the VR scenario as a target display region of the first virtual operation panel; and displaying the first virtual operation panel in the target display region.

The processor 171 is further configured to perform the following step: during the obtaining the second interactive operation instruction generated by a second operation performed on the first virtual operation panel, controlling the first virtual operation panel to be towards a preset direction in a moving process in the VR scenario.

The processor 171 is further configured to perform the following steps: before the interactive operation instruction is responded to, obtaining a second target operation instruction in the VR scenario; selecting and displaying at least one second virtual operation panel corresponding to the second target operation instruction from the plurality of virtual operation panels in the VR scenario; and obtaining an interactive operation instruction generated by an interactive operation performed by the interactive device on a target interactive object in an interactive object displayed in the first virtual operation panel and the at least one second virtual operation panel.

The processor 171 is further configured to perform the following steps: obtaining a fourth interactive operation instruction generated by an interactive operation performed by the interactive device on a third target interactive object displayed in the first virtual operation panel, where the target interactive object includes the third target interactive object, the interactive operation instruction includes the fourth interactive operation instruction, and the fourth interactive operation instruction is used for triggering a target event of closing the first virtual operation panel; and executing the target event of closing the first virtual operation panel triggered by the fourth interactive operation instruction in the VR scenario in response to the fourth interactive operation instruction.

The processor 171 is further configured to perform the following steps: before selecting and displaying the first virtual operation panel corresponding to the first target operation instruction from the plurality of virtual operation panels in the VR scenario, obtaining a 2D interface including the interactive object; and combining the 2D interface and a mesh model in the VR scenario, to obtain the first virtual operation panel, where the mesh model is used for marking a region that is used for performing an interactive operation and that is in the VR scenario.

The processor 171 is further configured to perform the following step: obtaining, in a case that a collider of the first virtual operation panel and a collider of the virtual object of the interactive device in the VR scenario intersect, the interactive operation instruction performed by the interactive device on the target interactive object in the interactive object displayed in the first virtual operation panel.

By using this embodiment of this application, a solution of an information interaction method is provided. A first target operation instruction is obtained in a VR scenario; a first virtual operation panel corresponding to the first target operation instruction is selected and displayed from a plurality of virtual operation panels in the VR scenario, the plurality of virtual operation panels being displayed mutually independently, and being respectively configured to display different interactive objects; an interactive operation instruction generated by an interactive operation performed by an interactive device on a target interactive object in an interactive object displayed in the first virtual operation panel is obtained, the interactive device being associated with the VR scenario; and a target event corresponding to the target interactive object is executed in the VR scenario in response to the interactive operation instruction. A plurality of mutually independent virtual operation panels in the VR scenario is respectively configured to display different interactive information, to implement different functions, thereby achieving the objective of operating the virtual operation panel, improving operation flexibility of the virtual operation panel, and further resolving the technical problem of low flexibility information interaction in the related technology.

Optionally, for examples in this embodiment, reference may be made to the examples described in the foregoing embodiments. Details are not described in this embodiment.

A person of ordinary skill in the art may understand that, the structure shown in FIG. 17 is only schematic. The electronic apparatus may be an electronic apparatus such as a smartphone (such as an Android mobile phone or an iOS mobile phone), a tablet computer, a palmtop computer, a mobile Internet device (MID), or a PAD. FIG. 17 does not limit the structure of the electronic apparatus. For example, the electronic apparatus may further include more or fewer components (such as a network interface and a display apparatus) than those shown in FIG. 17, or have a configuration different from that shown in FIG. 17.

A person of ordinary skill in the art may understand that all or some of the steps of the methods of the foregoing embodiments may be implemented by a program instructing relevant hardware of the electronic apparatus. The program may be stored in a computer readable storage medium. The storage medium may be a flash disk, a read-only memory (ROM), a random access memory (RAM), a magnetic disk, or an optical disc.

An embodiment of this application further provides a storage medium. Optionally, in this embodiment, the storage medium stores a computer program. The computer program, when run, is configured to perform the information interaction method.

Optionally, in this embodiment, the storage medium may be located in at least one of a plurality of network devices in the network shown in the foregoing embodiments.

Optionally, in this embodiment, the storage medium is configured to store program code used for performing the following steps:
  obtaining a first target operation instruction in a VR scenario;
  selecting and displaying a first virtual operation panel corresponding to the first target operation instruction from a plurality of virtual operation panels in the VR scenario, the plurality of virtual operation panels being displayed mutually independently, and being respectively configured to display different interactive objects;
  obtaining an interactive operation instruction generated by an interactive operation performed by an interactive device on a target interactive object in an interactive object displayed in the first virtual operation panel, the interactive device being associated with the VR scenario; and
  executing a target event corresponding to the target interactive object in the VR scenario in response to the interactive operation instruction.

Optionally, the storage medium is further configured to store program code used for performing the following step: obtaining a touch operation instruction generated by a touch operation performed by the interactive device on the target interactive object, where the interactive operation instruction includes the touch operation instruction, and the touch operation instruction is used for triggering the target event corresponding to the target interactive object.

Optionally, the storage medium is further configured to store program code used for performing the following steps: obtaining first position information of the interactive device during generating of the touch operation instruction, where the first position information is used for indicating a first position of a virtual object of the interactive device in the VR scenario on the first virtual operation panel; and executing, in a case that the first position information meets a preset condition, the target event corresponding to the target interactive object triggered by the touch operation instruction in the VR scenario.

Optionally, the storage medium is further configured to store program code used for performing the following steps: displaying first feedback information in the VR scenario after obtaining the touch operation instruction generated by the touch operation performed by the interactive device on the target interactive object, and/or outputting second feedback information to the interactive device, where the second feedback information is used for instructing the interactive device to perform a target operation.

Optionally, the storage medium is further configured to store program code used for performing the following steps: obtaining a first interactive operation instruction in a case that a first gesture performed on a first target interactive object by a virtual object of the interactive device in the VR scenario is a first preset gesture, where the interactive operation instruction includes the first interactive operation instruction, the first interactive operation instruction is used for triggering a target event of preparing for moving the first virtual operation panel, and the target interactive object includes the first target interactive object; obtaining a second interactive operation instruction after the first interactive operation instruction is responded to, where the interactive operation instruction includes the second interactive operation instruction, and the second interactive operation instruction is used for triggering a target event that the first virtual operation panel moves as the virtual object moves; and obtaining a third interactive operation instruction in a case that the first gesture changes to a second gesture, and the second gesture is a second preset gesture, where the interactive operation instruction includes the third interactive operation instruction, and the third interactive operation instruction is used for triggering the virtual object to stop a target event of moving the first virtual operation panel.

Optionally, the storage medium is further configured to store program code used for performing the following steps: obtaining second position information of the interactive device during generating of the third interactive operation instruction, where the second position information is used for indicating a second position of the virtual object of the interactive device in the VR scenario; determining a region including the second position in the VR scenario as a target display region of the first virtual operation panel; and displaying the first virtual operation panel in the target display region.

Optionally, the storage medium is further configured to store program code used for performing the following step: when obtaining the second interactive operation instruction performed on a second operation performed by the first virtual operation panel, controlling the first virtual operation panel to be towards a preset direction in a moving process in the VR scenario.

Optionally, the storage medium is further configured to store program code used for performing the following steps: before the interactive operation instruction is responded to, obtaining a second target operation instruction in the VR scenario; selecting and displaying at least one second virtual operation panel corresponding to the second target operation instruction from the plurality of virtual operation panels in the VR scenario; and obtaining an interactive operation instruction generated by an interactive operation performed by the interactive device on a target interactive object in an interactive object displayed in the first virtual operation panel and the at least one second virtual operation panel.

Optionally, the storage medium is further configured to store program code used for performing the following steps: obtaining a fourth interactive operation instruction generated by an interactive operation performed by the interactive device on a third target interactive object displayed in the first virtual operation panel, where the target interactive object includes the third target interactive object, the interactive operation instruction includes the fourth interactive operation instruction, and the fourth interactive operation instruction is used for triggering a target event of closing the first virtual operation panel; and executing the target event of closing the first virtual operation panel triggered by the fourth interactive operation instruction in the VR scenario in response to the fourth interactive operation instruction.

Optionally, the storage medium is further configured to store program code used for performing the following steps: before selecting and displaying the first virtual operation panel corresponding to the first target operation instruction from the plurality of virtual operation panels in the VR scenario, obtaining a 2D interface including the interactive object; and combining the 2D interface and a mesh model in the VR scenario, to obtain the first virtual operation panel, where the mesh model is used for marking a region that is used for performing an interactive operation and that is in the VR scenario.

Optionally, the storage medium is further configured to store program code used for performing the following step: obtaining, in a case that a collider of the first virtual operation panel and a collider of the virtual object of the interactive device in the VR scenario intersect, the interactive operation instruction performed by the interactive device on the target interactive object in the interactive object displayed in the first virtual operation panel.

Optionally, for examples in this embodiment, reference may be made to the examples described in the foregoing embodiments. Details are not described in this embodiment.

Optionally, in this embodiment, the storage medium may include, but is not limited to: any medium that can store program code, such as a USB flash drive, a ROM, a RAM, a removable hard disk, a magnetic disk, or an optical disc.

The sequence numbers of the foregoing embodiments of this application are merely for description purpose and do not indicate the preference of the embodiments.

If the integrated units in the foregoing embodiments are implemented in a form of software functional units and are sold or used as an independent product, the units may be stored in a computer readable storage medium. Based on such understanding, the technical solutions of this application essentially, or some contributing to the related technology, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, descriptions of the embodiments have different emphases, and as for parts that are not described in detail in one embodiment, reference can be made to the relevant descriptions of the other embodiments.

In the several embodiments provided in the present application, it should be understood that the disclosed client may be implemented in other manners. The described apparatus embodiments are merely schematic. For example, division of the units is merely division of logic functions, and there may be another division manner during actual implementation. For example, multiple units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated units may be implemented in a form of hardware or may be implemented in a form of a software functional unit.

The above descriptions are merely optional implementations of this application, and a person of ordinary skill in the art can make various improvements and refinements without departing from the spirit of this application. All such modifications and refinements should also be intended to be covered by this application.

What is claimed is:

1. An information interaction method, comprising:
simultaneously and mutually independently displaying, within a three-dimensional (3D) virtual reality (VR) generated environment, a plurality of virtual operation panels, each of the virtual operation panels associated with a respective one of a plurality of functions, and each of the virtual operation panels displaying an associated one of a plurality of sets of interactive objects, each of the virtual operation panels independently selectable by a virtual object of an interactive device controlled by a user of the 3D VR generated environment, each of the interactive objects of each of sets of interactive objects independently selectable by the virtual object, and each of the plurality of virtual operation panels comprises a respective one of a plurality of close buttons;
obtaining, by a processing circuitry, a first target operation instruction from the interactive device;
in response to the first target operation instruction, selecting, by the virtual object within the 3D VR generated environment, a first virtual operation panel from among the simultaneously displayed plurality of virtual operation panels, the first virtual operation panel displaying a first set of interactive objects of the plurality of sets of interactive objects;
obtaining, by the processing circuitry, a grasp operation instruction from the interactive device for a virtual hand to grasp one of the plurality operation panels and a move instruction to move the virtual hand after grasping the one of the plurality of operation panels;

in response to the grasp operation instruction and the move instruction, moving the plurality of operation panels in the 3D VR generated environment such that the plurality of operation panels always faces a head position of the user;

obtaining, by the processing circuitry, an interactive operation instruction from the interactive device;

in response to the interactive operation instruction, selecting a target interactive object from among the first set of interactive objects displayed in the first virtual operation panel and applying an interactive operation on the target interactive object with the virtual object of the interactive device while the plurality of virtual operation panels and the plurality of sets of interactive objects are simultaneously displayed in the 3D VR generated environment;

executing, by the processing circuitry, a target event corresponding to the target interactive object in the 3D VR generated environment in response to applying the interactive operation on the target interactive object with the virtual object of the interactive device;

clicking, by the virtual object in the 3D VR generated environment, a close button of the plurality of close buttons, the close button associated with the first virtual operation panel; and in response to clicking the close button, destroying, by the processing circuitry, the first virtual operation panel in the 3D VR generated environment without destroying any other virtual operation panel of the plurality of virtual operation panels being displayed in the 3D VR generated environment.

2. The method according to claim 1, wherein the obtaining an interactive operation instruction from the interactive device comprises:

obtaining, by the processing circuitry, a touch operation instruction generated by a touch operation performed by the interactive device on the target interactive object, wherein the interactive operation instruction comprises the touch operation instruction, and the touch operation instruction is configured to trigger execution of the target event corresponding to the target interactive object.

3. The method according to claim 2, wherein the executing a target event corresponding to the target interactive object in the (3D) VR generated environment in response to the interactive operation instruction comprises:

obtaining, by the processing circuitry, first position information of the interactive device during generation of the touch operation instruction, wherein the first position information is used for indicating a first position of the virtual object of the interactive device in the (3D) VR generated environment on the first virtual operation panel; and when the first position information meets a preset condition, executing, by the processing circuitry, the target event that corresponds to the target interactive object and that is triggered by the touch operation instruction in the (3D) VR generated environment.

4. The method according to claim 2, wherein after the obtaining a touch operation instruction generated by a touch operation performed by the interactive device on the target interactive object, the method further comprises:

displaying, by the processing circuitry, first feedback information in the (3D) VR generated environment; and/or outputting, by the processing circuitry, second feedback information to the interactive device, wherein the second feedback information is used for instructing the interactive device to perform a target operation.

5. The method according to claim 1, wherein the obtaining an interactive operation instruction from the interactive device comprises:

obtaining, by the processing circuitry, a first interactive operation instruction when a first gesture performed on a first target interactive object by the virtual object of the interactive device in the (3D) VR generated environment is a first preset gesture, wherein the interactive operation instruction comprises the first interactive operation instruction, the first interactive operation instruction is configured to trigger execution of a target event of preparing for moving the first virtual operation panel, and the target interactive object comprises the first target interactive object;

obtaining, by the processing circuitry, a second interactive operation instruction after the first interactive operation instruction is responded to, wherein the interactive operation instruction comprises the second interactive operation instruction, and the second interactive operation instruction is configured to trigger execution of a target event that the first virtual operation panel moves as the virtual object moves; and obtaining, by the processing circuitry, a third interactive operation instruction when the first gesture changes to a second gesture, and the second gesture is a second preset gesture, wherein the interactive operation instruction comprises the third interactive operation instruction, and the third interactive operation instruction is configured to initiate execution of the virtual object to stop a target event of moving the first virtual operation panel.

6. The method according to claim 5, wherein the executing a target event corresponding to the target interactive object in the (3D) VR generated environment in response to the interactive operation instruction comprises:

obtaining, by the processing circuitry, second position information of the interactive device during generating of the third interactive operation instruction, wherein the second position information is configured to indicate a second position of the virtual object of the interactive device in the (3D) VR generated environment;

determining, by the processing circuitry, a region comprising the second position in the (3D) VR generated environment as a target display region of the first virtual operation panel; and displaying, by the processing circuitry, the first virtual operation panel in the target display region, wherein the target event comprises the event of displaying the first virtual operation panel in the target display region.

7. The method according to claim 5, wherein during the obtaining the second interactive operation instruction performed on the first virtual operation panel, the method further comprises:

controlling, by the processing circuitry, the first virtual operation panel to be moved towards a preset direction in a moving process in the (3D) VR generated environment.

8. The method according to claim 1, wherein before the interactive operation instruction is responded to, the method further comprises:

obtaining, by the processing circuitry, a second target operation instruction in the (3D) VR generated environment;

selecting and displaying, within the (3D) VR generated environment, at least one second virtual operation panel corresponding to the second target operation instruction from the plurality of virtual operation panels in the (3D) VR generated environment; and obtaining, by the processing circuitry, an interactive operation instruction generated by an interactive operation applied on a target interactive object in an interactive object displayed in the first virtual operation panel and the at least one second virtual operation panel, wherein the interactive operation is performed by the interactive device.

9. The method according to claim 1, wherein:
the obtaining an interactive operation instruction from the interactive device comprises:
obtaining a fourth interactive operation instruction generated by an interactive operation performed by the interactive device on a third target interactive object displayed in the first virtual operation panel, wherein the target interactive object comprises the third target interactive object, the interactive operation instruction comprises the fourth interactive operation instruction, and the fourth interactive operation instruction is configured to trigger execution of a target event of closing the first virtual operation panel; and
the executing a target event corresponding to the target interactive object in the (3D) VR generated environment in response to the interactive operation instruction comprises:
executing the target event of closing the first virtual operation panel triggered by the fourth interactive operation instruction in the (3D) VR generated environment in response to the fourth interactive operation instruction.

10. The method according to claim 1, wherein before the selecting a first virtual operation panel from among the simultaneously displayed plurality of virtual operation panels in the (3D) VR generated environment, the method further comprises:
obtaining, by the processing circuitry, a two-dimensional (2D) interface comprising the target interactive object; and
combining, by the processing circuitry, the 2D interface and a mesh model in the (3D) VR generated environment, to obtain the first virtual operation panel, wherein the mesh model is used for marking a region that is used for performing an interactive operation and that is in the (3D) VR generated environment.

11. The method according to claim 1, wherein the obtaining an interactive operation instruction from the interactive device comprises:
obtaining, when a collider of the first virtual operation panel and a collider of the virtual object of the interactive device in the (3D) VR generated environment intersect, the interactive operation instruction from the interactive device.

12. The method according to claim 1, wherein a size of each of the plurality of virtual operation panels is determined by an associated one of a plurality of target interactive objects each displayed on a respective one of a plurality of virtual operation panels.

13. An information interaction apparatus, comprising one or more processors and one or more memories storing executable program units, the program units configured to be executed by the processor to:
simultaneously and mutually independently display, within a three-dimensional (3D) virtual reality (VR) generated environment, a plurality of virtual operation panels, each of the virtual operation panels associated with a respective one of a plurality of functions, and each of the virtual operation panels displaying an associated one of a plurality of sets of interactive objects, each of the virtual operation panels independently selectable by a virtual object of an interactive device controlled by a user of the (3D) VR generated environment, and each of the interactive objects of each of sets of interactive objects independently selectable by the virtual object, and each of the plurality of virtual operation panels comprises a respective one of a plurality of close buttons;
obtain a first target operation instruction from the interactive device;
in response to the first target operation instruction, select, by the virtual object within the (3D) VR generated environment, a first virtual operation panel from among the simultaneously displayed plurality of virtual operation panels, the first virtual operation panel displaying a first set of interactive objects of the plurality of sets of interactive objects;
obtain a grasp operation instruction from the interactive device for a virtual hand to grasp one of the plurality operation panels and a move instruction to move the virtual hand after grasping the one of the plurality of operation panels;
in response to the grasp operation instruction and the move instruction, move the plurality of operation panels in the 3D VR generated environment such that the plurality of operation panels always faces a head position of the user;
obtain an interactive operation instruction from the interactive device;
in response to the interactive operation instruction, select a target interactive object from among the first set of interactive objects displayed in the first virtual operation panel and apply an interactive operation on the target interactive object with the virtual object of the interactive device while the plurality of virtual operation panels and the plurality of sets of interactive objects are simultaneously displayed in the (3D) VR generated environment;
execute a target event corresponding to the target interactive object in the (3D) VR generated environment in response to application of the interactive operation on the target interactive object with the virtual object of the interactive device;
click, with the virtual object in the (3D) VR generated environment, a close button of the plurality of close buttons, the close button associated with the first virtual operation panel; and
in response to clicking the close button, destroy the first virtual operation panel in the (3D) VR generated environment without destroying any other virtual operation panel of the plurality of virtual operation panels being displayed in the (3D) VR generated environment.

14. The information interaction apparatus according to claim 13, wherein the program units are configured to be executed by the processor to:
obtain the interactive operation instruction by obtaining a touch operation instruction generated by a touch operation performed by the interactive device on the target interactive object, wherein the interactive operation instruction comprises the touch operation instruction, and the touch operation instruction is configured to trigger execution of the target event corresponding to the target interactive object.

15. The information interaction apparatus according to claim 14, wherein the program units are configured to be executed by the processor to execute the target event corresponding to the target interactive object in the (3D) VR generated environment in response to the interactive operation instruction by:
   obtaining first position information of the interactive device during generation of the touch operation instruction, wherein the first position information is used for indicating a first position of the virtual object of the interactive device in the (3D) VR generated environment on the first virtual operation panel; and
   when the first position information meets a preset condition, execute the target event that corresponds to the target interactive object and that is triggered by the touch operation instruction in the (3D) VR generated environment.

16. The information interaction apparatus according to claim 13, wherein the program units are further configured to, before the selection of a first virtual operation panel from among the simultaneously displayed plurality of virtual operation panels in the (3D) VR generated environment:
   obtain a two-dimensional (2D) interface comprising the interactive object; and
   combine the 2D interface and a mesh model in the (3D) VR generated environment, to obtain the first virtual operation panel, wherein the mesh model is used for marking a region that is used for performing an interactive operation and that is in the (3D) VR generated environment.

17. A non-transitory storage unit storing executable instructions that, when executed by processing circuitry, are configured to cause the processing circuitry to:
   simultaneously and mutually independently display, within a three-dimensional (3D) virtual reality (VR) generated environment, a plurality of virtual operation panels, each of the virtual operation panels associated with a respective one of a plurality of functions, and each of the virtual operation panels displaying an associated one of a plurality of sets of interactive objects, each of the virtual operation panels independently selectable by a virtual object of an interactive device controlled by a user of the (3D) VR generated environment, and each of the interactive objects of each of sets of interactive objects independently selectable by the virtual object;
   obtain a first target operation instruction from the interactive device;
   in response to the first target operation instruction, select, by the first object within the (3D) VR generated environment, a first virtual operation panel from among the simultaneously displayed plurality of virtual operation panels, the first virtual operation panel configured to display a first set of interactive objects of the plurality of sets of interactive objects;
   obtain a grasp operation instruction from the interactive device for a virtual hand to grasp one of the plurality operation panels and a move instruction to move the virtual hand after grasping the one of the plurality of operation panels;
   in response to the grasp operation instruction and the move instruction, move the plurality of operation panels in the 3D VR generated environment such that the plurality of operation panels always faces a head position of the user;
   obtain an interactive operation instruction from the interactive device;
   in response to the interactive operation instruction, select a target interactive object from among the first set of interactive objects displayed in the first virtual operation panel and apply an interactive operation on the target interactive object with the virtual object of the interactive device while the plurality of virtual operation panels and the plurality of sets of interactive objects are simultaneously displayed in the (3D) VR generated environment;
   execute a target event corresponding to the target interactive object in the (3D) VR generated environment in response to application of the interactive operation on the target interactive object with the virtual object of the interactive device;
   click, with the virtual object in the (3D) VR generated environment, a close button of the plurality of close buttons, the close button associated with the first virtual operation panel; and
   in response to clicking the close button, destroy the first virtual operation panel in the (3D) VR generated environment without destroying any other virtual operation panel of the plurality of virtual operation panels being displayed in the (3D) VR generated environment.

18. The non-transitory storage unit according to claim 17, wherein the instructions, when executed by processing circuitry, are configured to cause the processing circuitry to:
   obtain the interactive operation instruction by obtaining a touch operation instruction generated by a touch operation performed by the interactive device on the target interactive object, wherein the interactive operation instruction comprises the touch operation instruction, and the touch operation instruction is configured to trigger execution of the target event corresponding to the target interactive object.

19. The non-transitory storage unit according to claim 18, wherein the instructions, when executed by processing circuitry, are configured to cause the processing circuitry to execute the target event corresponding to the target interactive object in the (3D) VR generated environment in response to the interactive operation instruction by:
   obtaining first position information of the interactive device during generation of the touch operation instruction, wherein the first position information is used for indicating a first position of the virtual object of the interactive device in the (3D) VR generated environment on the first virtual operation panel; and
   when the first position information meets a preset condition, execute the target event that corresponds to the target interactive object and that is triggered by the touch operation instruction in the (3D) VR generated environment.

20. The non-transitory storage unit according to claim 17, wherein the instructions, when executed by processing circuitry, are configured to further cause the processing circuitry to, before causing the processing circuitry to select a first virtual operation panel from among the plurality of virtual operation panels in the (3D) VR generated environment:
   obtain a two-dimensional (2D) interface comprising the interactive object; and
   combine the 2D interface and a mesh model in the (3D) VR generated environment, to obtain the first virtual operation panel, wherein the mesh model is used for marking a region that is used for performing an interactive operation and that is in the (3D) VR generated environment.

\* \* \* \* \*